United States Patent
Raitarovskyi

(10) Patent No.: US 12,437,438 B2
(45) Date of Patent: Oct. 7, 2025

(54) ESTIMATING BODY POSES BASED ON IMAGES AND HEAD-POSE INFORMATION

(71) Applicant: QUALCOMM Incorporated, San Diego, CA (US)

(72) Inventor: Maksym Raitarovskyi, Madrid (ES)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/463,895

(22) Filed: Sep. 8, 2023

(65) Prior Publication Data
US 2025/0086820 A1   Mar. 13, 2025

(51) Int. Cl.
*G06T 7/70* (2017.01)
*G06F 3/01* (2006.01)
*G06F 3/0346* (2013.01)

(52) U.S. Cl.
CPC ............... *G06T 7/70* (2017.01); *G06F 3/012* (2013.01); *G06F 3/0346* (2013.01); *G06T 2207/20081* (2013.01); *G06T 2207/30196* (2013.01); *G06T 2207/30244* (2013.01)

(58) Field of Classification Search
CPC .......... G06T 7/70; G06F 3/012; G06F 3/0346
USPC ..................................................... 345/156, 8
See application file for complete search history.

(56) References Cited

U.S. PATENT DOCUMENTS

| | | | |
|---|---|---|---|
| 10,636,170 B1 | 4/2020 | Reddy et al. | |
| 10,664,993 B1* | 5/2020 | Reddy | G06T 7/75 |
| 2020/0202538 A1* | 6/2020 | Hsu | G06T 7/50 |
| 2021/0149190 A1 | 5/2021 | Johnson et al. | |
| 2022/0319041 A1 | 10/2022 | Jiang et al. | |
| 2023/0214458 A1 | 7/2023 | Marsden et al. | |

OTHER PUBLICATIONS

Behera A., et al., "A CNN Model for Head Pose Recognition Using Wholes and Regions", 2019 14th IEEE International Conference on Automatic Face Gesture Recognition (FG 2019), IEEE, May 14, 2019, 4 Pages, XP033575956, p. 4, col. 2, line 23-line 24 p. 7, col. 1, line 18-line 20 caption of figure 2.
Partial International Search Report—PCT/US2024/035466—ISA/EPO—Sep. 9, 2024.
International Search Report and Written Opinion—PCT/US2024/035466—ISA/EPO—Dec. 5, 2024.

* cited by examiner

*Primary Examiner* — Jimmy H Nguyen
(74) *Attorney, Agent, or Firm* — Polsinelli LLP

(57) ABSTRACT

Systems and techniques are described herein for pose estimation of a person. For instance, a method for pose estimation of a person is provided. The method may include obtaining an image of the person; obtaining a head pose of the person; determining a search region of the image based on the head pose; and determining a pose of the person based on the search region.

30 Claims, 11 Drawing Sheets

ESTIMATING BODY POSES BASED ON IMAGES AND HEAD-POSE INFORMATION

TECHNICAL FIELD

The present disclosure generally relates to estimating body poses. For example, aspects of the present disclosure include systems and techniques for estimating head poses based on images and head-pose information.

BACKGROUND

Body-pose estimation techniques seek to estimate a pose of a body of a person. Some body-pose estimation techniques use a trained machine-learning model to generate a body pose based on images of the body. As an example, the machine-learning model may be trained by being provided with images. The machine-learning model may generate body poses based on the images. The body poses generated the machine-learning model may be compared with ground truth body poses corresponding to the images. Parameters (e.g., weights) of the machine-learning model may be adjusted based on a difference (e.g., error) between the body poses generated by the machine-learning model and the ground truth body poses. After being trained (e.g., using many images and corresponding ground truth body poses), the machine-learning model may be used to infer body poses based on images (e.g., new images generated live).

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for pose estimation of a person. According to at least one example, a method is provided for pose estimation of a person. The method includes: obtaining an image of the person; obtaining a head pose of the person; determining a search region of the image based on the head pose; and determining a pose of the person based on the search region.

In another example, an apparatus for pose estimation of a person is provided that includes at least one memory and at least one processor (e.g., configured in circuitry) coupled to the at least one memory. The at least one processor configured to: obtain an image of the person; obtain a head pose of the person; determine a search region of the image based on the head pose; and determine a pose of the person based on the search region.

In another example, a non-transitory computer-readable medium is provided that has stored thereon instructions that, when executed by one or more processors, cause the one or more processors to: obtain an image of the person; obtain a head pose of the person; determine a search region of the image based on the head pose; and determine a pose of the person based on the search region.

In another example, an apparatus for pose estimation of a person is provided. The apparatus includes: means for obtaining an image of the person; means for obtaining a head pose of the person; means for determining a search region of the image based on the head pose; and means for determining a pose of the person based on the search region.

In some aspects, one or more of the apparatuses described herein is, can be part of, or can include a mobile device (e.g., a mobile telephone or so-called "smart phone", a tablet computer, or other type of mobile device), an extended reality device (e.g., a virtual reality (VR) device, an augmented reality (AR) device, or a mixed reality (MR) device), a vehicle (or a computing device or system of a vehicle), a smart or connected device (e.g., an Internet-of-Things (IoT) device), a wearable device, a personal computer, a laptop computer, a video server, a television (e.g., a network-connected television), a robotics device or system, or other device. In some aspects, each apparatus can include an image sensor (e.g., a camera) or multiple image sensors (e.g., multiple cameras) for capturing one or more images. In some aspects, each apparatus can include one or more displays for displaying one or more images, notifications, and/or other displayable data. In some aspects, each apparatus can include one or more speakers, one or more light-emitting devices, and/or one or more microphones. In some aspects, each apparatus can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
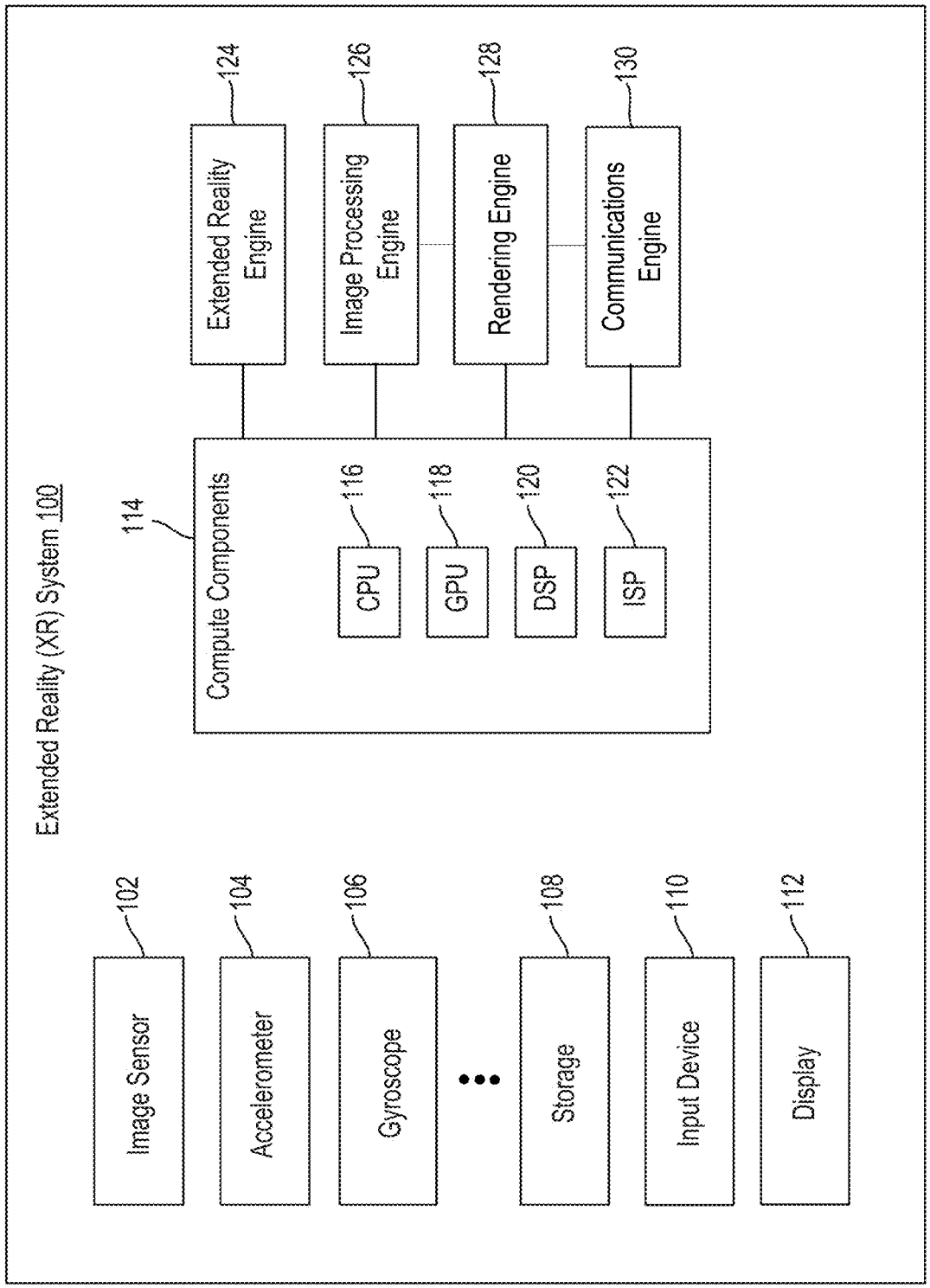
FIG. 1 is a block diagram illustrating an architecture of an example extended reality (XR) system, in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the exemplary aspects will provide those skilled in the art with an enabling description for implementing an exemplary aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

As mentioned previously, a machine-learning model may be trained to generate a body pose based on images of the body. In the present disclosure, the term "pose" may refer to a position and/or orientation of a thing. The position may be defined according to three degrees of freedom, for example, along three orthogonal axes such as an x-axis, a y-axis, and a z-axis, relative to a coordinate system and/or or a reference point. The orientation may be defined according to another three degrees of freedom, such as roll, pitch, and yaw. In the present disclosure, term "pose," with reference to a body or person (e.g., "body pose," "pose of a body," or "pose of a person"), may refer to poses of one or more respective parts of the body of the person. For example, a body pose may include a pose of a torso, a pose of shoulders, a pose of hips, and poses of respective limbs of the person. In the present disclosure, term "pose," with reference to a head (e.g., "head pose" or "pose of a head"), may refer to poses (including a position and orientation) of a head of a person. In the present disclosure, term "pose," with reference to a hand or hands (e.g., "hand pose," "pose of a hand," or "pose of hands"), may refer to poses (including a position and orientation) of one or two hands of a person.

Body-pose estimation techniques may be computationally intensive. For example, it may take many computing operations (which may consume power and/or take time) to perform a body-pose estimation technique. Further, the intensity of the computations may be exacerbated when such body-pose estimation techniques operate on large images (e.g., images of a large field of view and/or images including millions of pixels). For example, a neural network of a body-pose estimation technique may include an input neuron for each pixel of an input image and may store activations for each input neuron. Thus, larger input images require larger neural networks and/or more operations (e.g., associated with activations between the neurons) to process. As an example of a computationally intense image, a megapixel image of a large field of view may include several people. The several people may be relatively distant from the camera and may occupy only tens of thousands of pixels each (e.g., a portion of the field of view of the camera). In some cases, only one or a few of the several people may be of interest to a user of the camera which captured the image. A body-pose estimation technique may operate on the entirety of the image. Further, the body-pose estimation technique may seek to estimate a respective body pose for each of the several people. This may waste computational operations for example, by processing pixels that do not include the people and by estimating poses of people that are not of interest to the user.

Systems, apparatuses, methods (also referred to as processes), and computer-readable media (collectively referred to herein as "systems and techniques") are described herein for estimating body poses based on head poses. The systems and techniques described herein may obtain an image of a person (e.g., using a camera) and obtain a head pose of the person. For example, the person may be wearing a head-mounted device (e.g., a head-mounted display, such as an extended reality (XR) headset). The head-mounted device may determine a head pose of the person (e.g., using inertial measurement units (IMUs) and/or a simultaneous localization and mapping (SLAM) technique). The head-mounted device of the person may transmit the head pose of the person to the systems and techniques. The systems and techniques may determine a search region of the image based on the head pose. For example, the systems and techniques may determine, based on the head pose of the person, a search region within the image that may represent the person. The systems and techniques may determine a pose of the person based on the search region. For example, the systems and techniques may provide the search region to a trained pose-estimation model which may generate the pose of the person.

By providing the search region to the trained pose-estimation model (rather than the entirety of the image) the systems and techniques may conserve computational operations. For example, the trained pose-estimation model may operate only on the search region of the image (which may represent the person) rather than the entirety of the image and thereby perform fewer activation calculations between the input layer and other layers of the trained pose-estimation model. Further, by providing the search region of the image to the trained pose-estimation model, the systems and techniques may conserve computational operations by limiting the number of persons whose pose is determined by the trained pose-estimation model to only persons of interest to a user of the systems and techniques.

Various aspects of the application will be described with respect to the figures below.

FIG. 1 is a diagram illustrating an architecture of an example extended reality (XR) system 100, in accordance with some aspects of the disclosure. XR system 100 may execute XR applications and implement XR operations.

In this illustrative example, XR system 100 includes one or more image sensors 102, an accelerometer 104, a gyroscope 106, storage 108, an input device 110, a display 112, Compute components 114, an XR engine 124, an image processing engine 126, a rendering engine 128, and a communications engine 130. It should be noted that the components 102-130 shown in FIG. 1 are non-limiting examples provided for illustrative and explanation purposes, and other examples may include more, fewer, or different components than those shown in FIG. 1. For example, in some cases, XR system 100 may include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors, audio sensors, etc.), one or more display devices, one more other processing engines, one or more other hardware components, and/or one or more other software and/or hardware components that are not shown in FIG. 1. While various components of XR system 100, such as image sensor 102, may be referenced in the singular form herein, it should be understood that XR system 100 may include multiple of any component discussed herein (e.g., multiple image sensors 102).

Display 112 may be, or may include, a glass, a screen, a lens, a projector, and/or other display mechanism that allows a user to see the real-world environment and also allows XR content to be overlaid, overlapped, blended with, or otherwise displayed thereon.

XR system 100 may include, or may be in communication with, (wired or wirelessly) an input device 110. Input device 110 may include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device discussed herein, or any combination thereof. In some cases, image sensor 102 may capture images that may be processed for interpreting gesture commands.

XR system 100 may also communicate with one or more other electronic devices (wired or wirelessly). For example, communications engine 130 may be configured to manage connections and communicate with one or more electronic devices. In some cases, communications engine 130 may correspond to communication interface 1026 of FIG. 10.

In some implementations, image sensors 102, accelerometer 104, gyroscope 106, storage 108, display 112, compute components 114, XR engine 124, image processing engine 126, and rendering engine 128 may be part of the same computing device. For example, in some cases, image sensors 102, accelerometer 104, gyroscope 106, storage 108, display 112, compute components 114, XR engine 124, image processing engine 126, and rendering engine 128 may be integrated into an HMD, extended reality glasses, smartphone, laptop, tablet computer, gaming system, and/or any other computing device. However, in some implementations, image sensors 102, accelerometer 104, gyroscope 106, storage 108, display 112, compute components 114, XR engine 124, image processing engine 126, and rendering engine 128 may be part of two or more separate computing devices. For instance, in some cases, some of the components 102-130 may be part of, or implemented by, one computing device and the remaining components may be part of, or implemented by, one or more other computing devices. For example, such as in a split perception XR system, XR system 100 may include a first device (e.g., an HMD), including display 112, image sensor 102, accelerometer 104, gyroscope 106, and/or one or more compute components 114. XR system 100 may also include a second device including additional compute components 114 (e.g., implementing XR engine 124, image processing engine 126, rendering engine 128, and/or communications engine 130). In such an example, the second device may generate virtual content based on information or data (e.g., images, sensor data such as measurements from accelerometer 104 and gyroscope 106) and may provide the virtual content to the first device for display at the first device. The second device may be, or may include, a smartphone, laptop, tablet computer, personal computer, gaming system, a server computer or server device (e.g., an edge or cloud-based server, a personal computer acting as a server device, or a mobile device acting as a server device), any other computing device and/or a combination thereof.

Storage 108 may be any storage device(s) for storing data. Moreover, storage 108 may store data from any of the components of XR system 100. For example, storage 108 may store data from image sensor 102 (e.g., image or video data), data from accelerometer 104 (e.g., measurements), data from gyroscope 106 (e.g., measurements), data from compute components 114 (e.g., processing parameters, preferences, virtual content, rendering content, scene maps, tracking and localization data, object detection data, privacy data, XR application data, face recognition data, occlusion data, etc.), data from XR engine 124, data from image processing engine 126, and/or data from rendering engine 128 (e.g., output frames). In some examples, storage 108 may include a buffer for storing frames for processing by compute components 114.

Compute components 114 may be, or may include, a central processing unit (CPU) 116, a graphics processing unit (GPU) 118, a digital signal processor (DSP) 120, an image signal processor (ISP) 122, and/or other processor (e.g., a neural processing unit (NPU) implementing one or more trained neural networks). Compute components 114 may perform various operations such as image enhancement, computer vision, graphics rendering, extended reality operations (e.g., tracking, localization, pose estimation, mapping, content anchoring, content rendering, predicting, etc.), image and/or video processing, sensor processing, recognition (e.g., text recognition, facial recognition, object recognition, feature recognition, tracking or pattern recognition, scene recognition, occlusion detection, etc.), trained machine-learning operations, filtering, and/or any of the various operations described herein. In some examples, compute components 114 may implement (e.g., control, operate, etc.) XR engine 124, image processing engine 126, and rendering engine 128. In other examples, compute components 114 may also implement one or more other processing engines.

Image sensor 102 may include any image and/or video sensors or capturing devices. In some examples, image sensor 102 may be part of a multiple-camera assembly, such as a dual-camera assembly. Image sensor 102 may capture image and/or video content (e.g., raw image and/or video data), which may then be processed by compute components 114, XR engine 124, image processing engine 126, and/or rendering engine 128 as described herein.

In some examples, image sensor 102 may capture image data and may generate images (also referred to as frames) based on the image data and/or may provide the image data or frames to XR engine 124, image processing engine 126, and/or rendering engine 128 for processing. An image or frame may include a video frame of a video sequence or a still image. An image or frame may include a pixel array representing a scene. For example, an image may be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, image sensor 102 (and/or other camera of XR system 100) may be configured to also capture depth information. For example, in some implementations, image sensor 102 (and/or other camera) may include an RGB-depth (RGB-D) camera. In some cases, XR system 100 may include one or more depth sensors (not shown) that are separate from image sensor 102 (and/or other camera) and that may capture depth information. For instance, such a depth sensor may obtain depth information independently from image sensor 102. In some examples, a depth sensor may be physically installed in the same general location or position as image sensor 102 but may operate at a different frequency or frame rate from image sensor 102. In some examples, a depth sensor may take the form of a light source that may project a structured or textured light pattern, which may include one or more narrow bands of light, onto one or more objects in a scene. Depth information may then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

XR system 100 may also include other sensors in its one or more sensors. The one or more sensors may include one or more accelerometers (e.g., accelerometer 104), one or more gyroscopes (e.g., gyroscope 106), and/or other sensors. The one or more sensors may provide velocity, orientation, and/or other position-related information to compute components 114. For example, accelerometer 104 may detect acceleration by XR system 100 and may generate acceleration measurements based on the detected acceleration. In some cases, accelerometer 104 may provide one or more translational vectors (e.g., up/down, left/right, forward/back) that may be used for determining a position or pose of XR system 100. Gyroscope 106 may detect and measure the orientation and angular velocity of XR system 100. For example, gyroscope 106 may be used to measure the pitch, roll, and yaw of XR system 100. In some cases, gyroscope 106 may provide one or more rotational vectors (e.g., pitch, yaw, roll). In some examples, image sensor 102 and/or XR engine 124 may use measurements obtained by accelerometer 104 (e.g., one or more translational vectors) and/or gyroscope 106 (e.g., one or more rotational vectors) to calculate the pose of XR system 100. As previously noted, in other examples, XR system 100 may also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors may include at least one IMU. An IMU is an electronic device that measures the specific force, angular rate, and/or the orientation of XR system 100, using a combination of one or more accelerometers, one or more gyroscopes, and/or one or more magnetometers. In some examples, the one or more sensors may output measured information associated with the capture of an image captured by image sensor 102 (and/or other camera of XR system 100) and/or depth information obtained using one or more depth sensors of XR system 100.

The output of one or more sensors (e.g., accelerometer 104, gyroscope 106, one or more IMUs, and/or other sensors) can be used by XR engine 124 to determine a pose of XR system 100 (also referred to as the head pose) and/or the pose of image sensor 102 (or other camera of XR system 100). In some cases, the pose of XR system 100 and the pose of image sensor 102 (or other camera) can be the same. The pose of image sensor 102 refers to the position and orientation of image sensor 102 relative to a frame of reference (e.g., with respect to a field of view). In some implementations, the camera pose can be determined for 6-Degrees of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees of Freedom (3DoF), which refers to the three angular components (e.g. roll, pitch, and yaw).

In some cases, a device tracker (not shown) can use the measurements from the one or more sensors and image data from image sensor 102 to track a pose (e.g., a 6DoF pose) of XR system 100. For example, the device tracker can fuse visual data (e.g., using a visual tracking solution) from the image data with inertial data from the measurements to determine a position and motion of XR system 100 relative to the physical world (e.g., the scene) and a map of the physical world. As described below, in some examples, when tracking the pose of XR system 100, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of XR system 200 within the scene and the 3D map of the scene, etc. The 3D map can provide a digital representation of a scene in the real/physical world. In some examples, the 3D map can anchor position-based objects and/or content to real-world coordinates and/or objects. XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 102 and/or XR system 100 as a whole can be determined and/or tracked by compute components 114 using a visual tracking solution based on images captured by image sensor 102 (and/or other camera of XR system 100). For instance, in some examples, compute components 114 can perform tracking using computer vision-based tracking, model-based tracking, and/or simultaneous localization and mapping (SLAM) techniques. For instance, compute components 114 can perform SLAM or can be in communication (wired or wireless) with a SLAM system (not shown). SLAM refers to a class of techniques where a map of an environment (e.g., a map of an environment being modeled by XR system 100) is created while simultaneously tracking the pose of a camera (e.g., image sensor 102) and/or XR system 100 relative to that map. The map can be referred to as a SLAM map and can be three-dimensional (3D). The SLAM techniques can be performed using color or grayscale image data captured by image sensor 102 (and/or other camera of XR system 100) and can be used to generate estimates of 6DoF pose measurements of image sensor 102 and/or XR system 100. Such a SLAM technique configured to perform 6DoF tracking can be referred to as 6DoF SLAM. In some cases, the output of the one or more sensors (e.g., accelerometer 104, gyroscope 106, one or more IMUs, and/or other sensors) can be used to estimate, correct, and/or otherwise adjust the estimated pose.

Figure 2A:
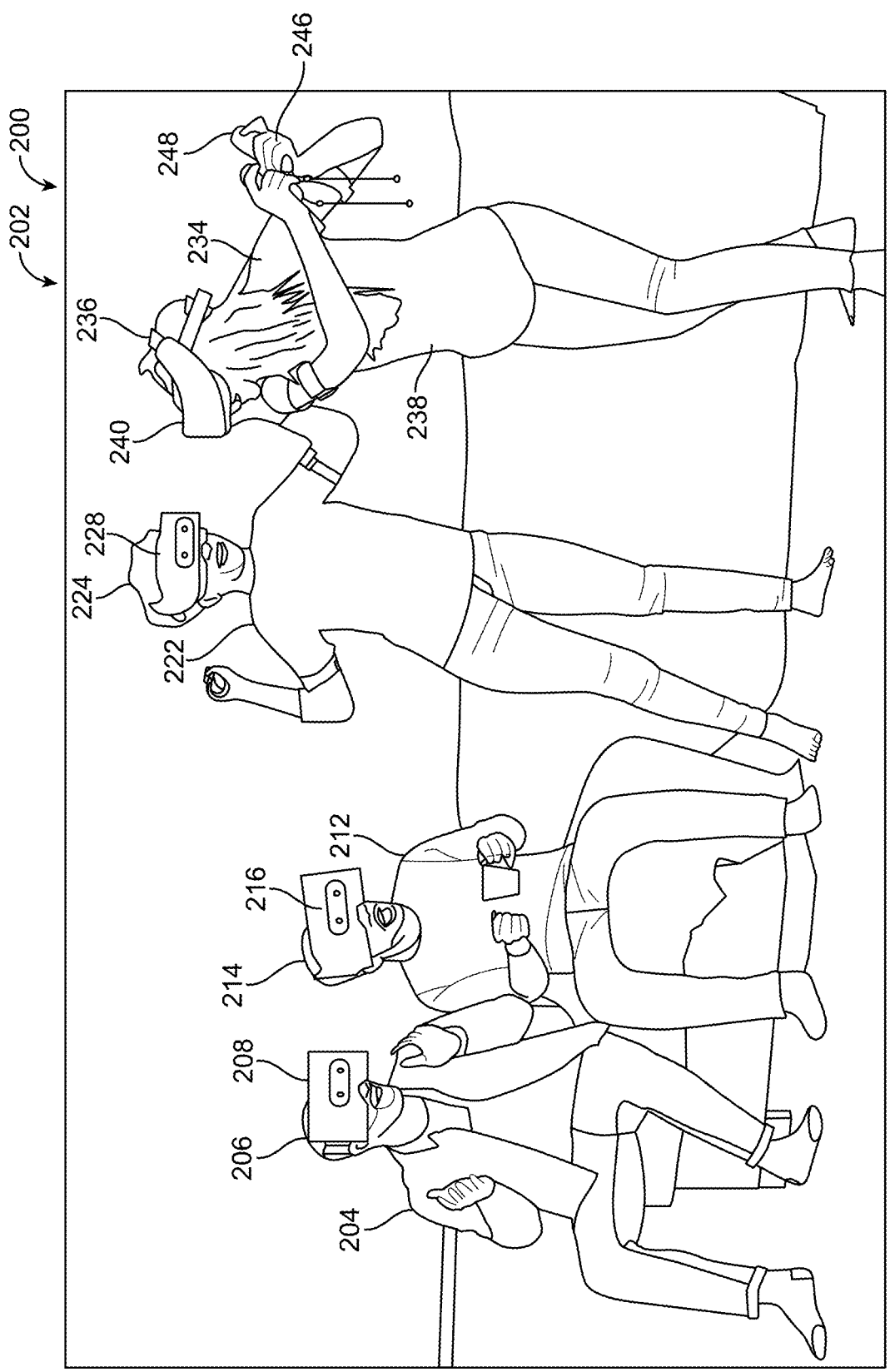
FIG. 2A is a drawing illustrating a scene in which a system may be used to determine a pose of a body of a person, according to various aspects of the present disclosure.
Figure 2B:
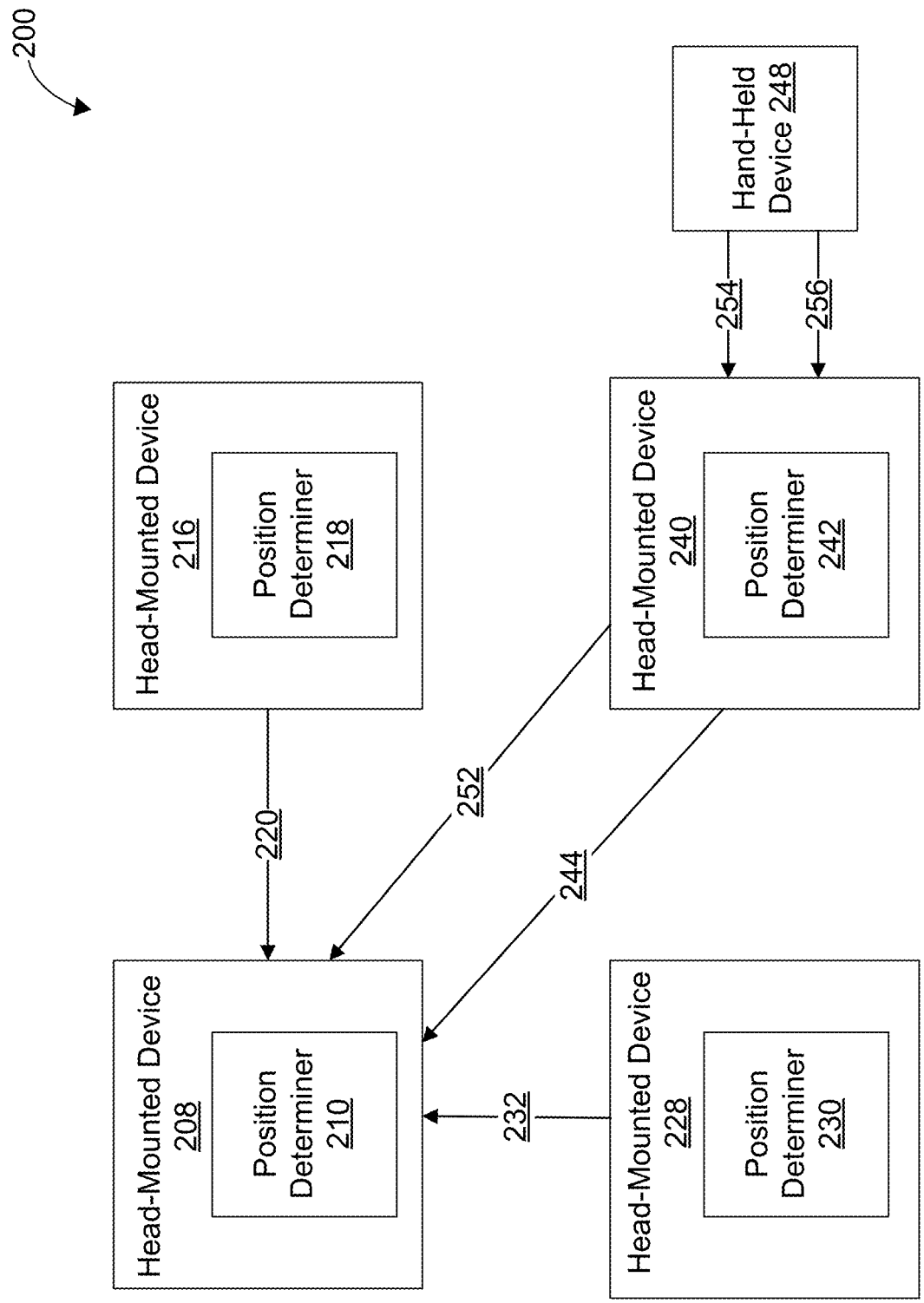
FIG. 2B is a block diagram illustrating system for determining a pose of a body of a person, according to various aspects of the present disclosure.

FIG. 2A is a drawing illustrating a scene 202 in which a system 200 may be used to determine a pose of a body 238 of a person 234, according to various aspects of the present disclosure. FIG. 2B is a block diagram illustrating system 200 for determining a pose of a body 238 of a person 234, according to various aspects of the present disclosure. System 200 includes a head-mounted device 240 which may be worn on a head 236 of person 234, according to various aspects of the present disclosure. System 200 further includes head-mounted device 208 that is provided as an example for the purpose of describing implementing the systems and techniques of the present disclosure. In general, head-mounted device 240 may determine a pose of head 236 of person 234. Head-mounted device 240 may transmit pose information 244 indicative of the pose of head 236 to head-mounted device 208. Head-mounted device 208 may capture an image 252 of person 234. Head-mounted device 208 may determine a pose of body 238 of person 234 based on the pose of head 236 and image 252.

Each of head-mounted device 208, head-mounted device 216, head-mounted device 228, and head-mounted device 240 may be an example of XR system 100 of FIG. 1. Head-mounted device 208 of user 204 is provided as an example for the purpose of describing implementing the systems and techniques of the present disclosure. The systems and techniques may be implemented by any or all of head-mounted device 216, head-mounted device 228, and/or head-mounted device 240. Further, the systems and techniques may be implemented by another device (e.g., another head-mounted device or another device such as a gaming system including a camera or computing system including a camera).

Each of head-mounted device 208, head-mounted device 216, head-mounted device 228, and head-mounted device 240 may include a respective pose determiner that may determine a pose of the respective head-mounted device. For example, head-mounted device 208 may include a position determiner 210 that may determine a pose of head-mounted device 208 (and/or of head 206 of user 204 on which head-mounted device 208 is worn), head-mounted device 216 may include a position determiner 218 that may determine a pose of head-mounted device 216 (and/or of head 214 of person 212 on which head-mounted device 216 is worn), head-mounted device 228 may include a position determiner 230 that may determine a pose of head-mounted device 228 (and/or of head 224 of person 222 on which head-mounted device 228 is worn), and head-mounted device 240 may include a position determiner 242 that may determine a pose of head-mounted device 240 (and/or of head 236 on which head-mounted device 240 is worn).

In some aspects, each of head-mounted device 208, head-mounted device 216, head-mounted device 228, and head-mounted device 240 may include a respective accelerometer 104, a respective gyroscope 106, and/or respective inertial measurement units (IMUs). Each of head-mounted device 208, head-mounted device 216, head-mounted device 228, and head-mounted device 240 may determine its respective pose (and/or a pose of a head on which it is worn) based on data from its respective accelerometer 104, its respective gyroscope 106, and/or its respective inertial measurement units (IMUs). For example, head-mounted device 208 (e.g., using position determiner 210) may determine a pose of head 206 based on data from its accelerometer 104, gyroscope 106, and/or IMUs, head-mounted device 216 (e.g., using position determiner 218) may determine a pose of head 214 based on data from its accelerometer 104, gyroscope 106, and/or IMUs, head-mounted device 228 (e.g., using position determiner 230) may determine a pose of head 224 based on data from its accelerometer 104, gyroscope 106, and/or IMUs, and head-mounted device 240 (e.g., using position determiner 242) may determine a pose of head 236 based on data from its accelerometer 104, gyroscope 106, and/or IMUs.

In some aspects, each of head-mounted device 208, head-mounted device 216, head-mounted device 228, and head-mounted device 240 may include a respective image sensor 102 which may capture images. Additionally, each of head-mounted device 208, head-mounted device 216, head-mounted device 228, and head-mounted device 240 may implement computer vision-based tracking, model-based tracking, and/or simultaneous localization and mapping (SLAM) techniques based images captured by its respective image sensor 102. For example, head-mounted device 208 (e.g., using position determiner 210) may determine a pose of head 206 based on images from its image sensor 102, head-mounted device 216 (e.g., using position determiner 218) may determine a pose of head 214 based on images from its image sensor 102, head-mounted device 228 (e.g., using position determiner 230) may determine a pose of head 224 based on images from its image sensor 102, and head-mounted device 240 (e.g., using position determiner 242) may determine a pose of head 236 based on images from its image sensor 102.

Additionally, each of head-mounted device 208, head-mounted device 216, head-mounted device 228, and head-mounted device 240 may include a respective communications engine 130 which it may use to communicate with others of head-mounted device 208, head-mounted device 216, head-mounted device 228, and head-mounted device 240. Each of head-mounted device 208, head-mounted device 216, head-mounted device 228, and head-mounted device 240 may provide each of the others of head-mounted device 208, head-mounted device 216, head-mounted device 228, and head-mounted device 240 with its determined head pose. For example, head-mounted device 216 may transmit pose information 220, which may be indicative of a pose of head 214, to head-mounted device 208, head-mounted device 228 may transmit pose information 232, which may be indicative of a pose of head 224, to head-mounted device 208, and head-mounted device 240 may transmit pose information 244, which may be indicative of a pose of head 236, to head-mounted device 208. Although not illustrated in FIG. 2B, head-mounted device 216 may transmit pose information 220, to head-mounted device 228 and/or head-mounted device 240, head-mounted device 228 may transmit pose information 232, to head-mounted device 216 and/or head-mounted device 240, head-mounted device 240 may transmit pose information 244, to head-mounted device 216 and/or head-mounted device 228, and/or head-mounted device 208 may transmit pose information indicative of a pose of head 206 to head-mounted device 216, head-mounted device 228, and/or head-mounted device 240.

In some aspects, head-mounted device 208, head-mounted device 216, head-mounted device 228, and head-mounted device 240 may establish a common frame of reference. For example, all of head-mounted device 208, head-mounted device 216, head-mounted device 228, and head-mounted device 240 may establish a common coordinate system for describing poses.

Accordingly, when head-mounted device 208, head-mounted device 216, head-mounted device 228, and head-mounted device 240 transmit pose information, the pose information may be relative to the common frame of reference.

As an example of operations of the systems and techniques of the present disclosure, head-mounted device 208 may determine a pose of body 238 of person 234 based on the pose of head 236 (e.g., as received by head-mounted device 208 in pose information 244) and image 252. Additional details regarding how head-mounted device 208 may determine the pose of bounding-volume generator 308 are described with regard to FIGS. 3-6. In some aspects, the systems and techniques may provide the pose of head 236 to a pose-estimation machine-learning model as a prior and cause the pose-estimation machine-learning model to determine the pose of body 238 based on image 252 using the pose of head 236 as a prior.

In some aspects, one or more of head-mounted device 208, head-mounted device 216, head-mounted device 228, and head-mounted device 240 may be associated with a respective hand-held device. Hand-held device 248 is provided as an example. Head-mounted device 240 is associated with hand-held device 248. Person 234 may hold hand-held device 248 in a hand 246 of person 234. Head-mounted device 240 may determine a pose of hand-held device 248. In some aspects, hand-held device 248 may include an accelerometer, a gyroscope, and/or an IMU. In such aspects, hand-held device 248 may generate movement data 254 based on the accelerometer, the gyroscope, and/or the IMU and transmit movement data 254 to head-mounted device 240.

Head-mounted device 240 may determine a pose of hand-held device 248 based on movement data 254. Additionally or alternatively, in some aspects, hand-held device 248 may determine a pose of hand-held device 248 and (e.g., based on movement data 254) and may transmit the pose of hand-held device 248 to head-mounted device 240. Additionally or alternatively, in some aspects, head-mounted device 240 may capture image(s) 256 of hand-held device 248 and may (e.g., using a tracking algorithm) determine a pose of hand-held device 248. In some aspects, head-mounted device 208 may determine a pose of person 234 based, at least in part, on a pose of hand-held device 248. For example, head-mounted device 240 may transmit the pose of hand-held device 248 to head-mounted device 208 (e.g., as part of pose information 244 or separately) and head-mounted device 208 may use the pose of hand-held device 248 when determining the pose of person 234. In some aspects, the systems and techniques may provide the pose of hand 246 to a pose-estimation machine-learning model as a prior and cause the pose-estimation machine-learning model to determine the pose of body 238 based on image 252 using the pose of hand 246 as a prior. Additionally or alternatively, the systems and techniques may provide the pose of hand 246 and the pose of head 236 to the pose-estimation machine-learning model as priors and cause the pose-estimation machine-learning model to determine the pose of body 238 based on image 252 using the pose of hand 246 and the pose of head 236 as priors.

Figure 3:
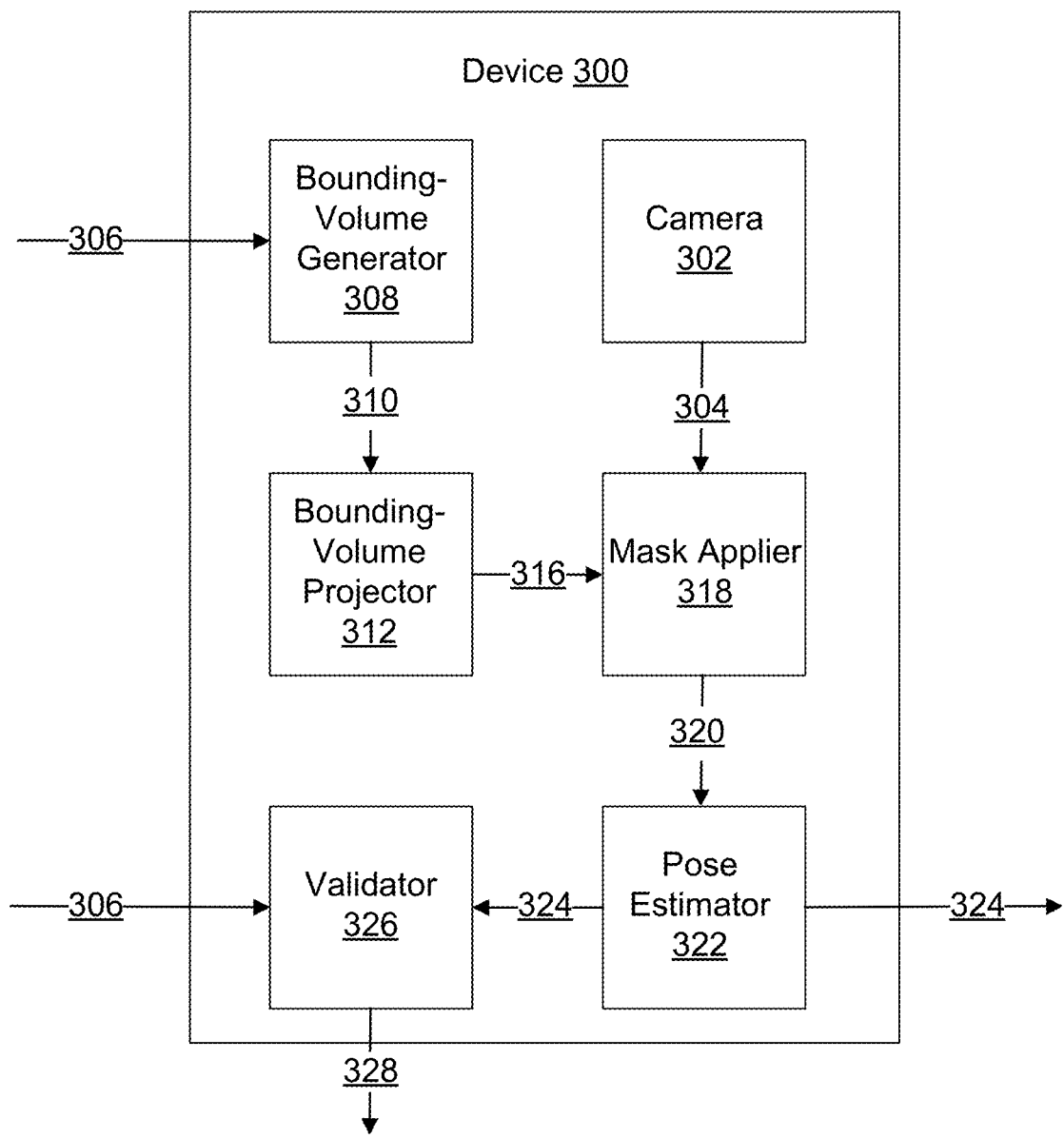
FIG. 3 is a block diagram of device for determining a pose of a body of a person, according to various aspects of the present disclosure.

FIG. 3 is a block diagram of device 300 for determining a pose 324 of a body 238 of a person 234, according to various aspects of the present disclosure. Device 300 of FIG. 3 is provided as an example of implementing the systems and techniques of the present disclosure. Device 300 may be an example of head-mounted device 208, head-mounted device 216, head-mounted device 228. Additionally or alternatively, device 300 may be an example of another device or system (e.g., a computing device including a camera or a gaming system including a camera). Head-mounted device 208, head-mounted device 216, head-mounted device 228, and/or head-mounted device 228 and or the aforementioned other device or system may include elements substantially similar to, or the same as, the elements described with regard to device 300 and FIG. 3. Further, head-mounted device 208, head-mounted device 216, head-mounted device 228, and head-mounted device 240, and/or the other aforementioned device or system may perform the operations described with regard to device 300 and FIG. 3. For example, a gaming system including a camera or a computing system including a camera may include the elements described with regard to device 300 of FIG. 3 and may perform the operations described with regard to FIG. 3.

Figure 4:
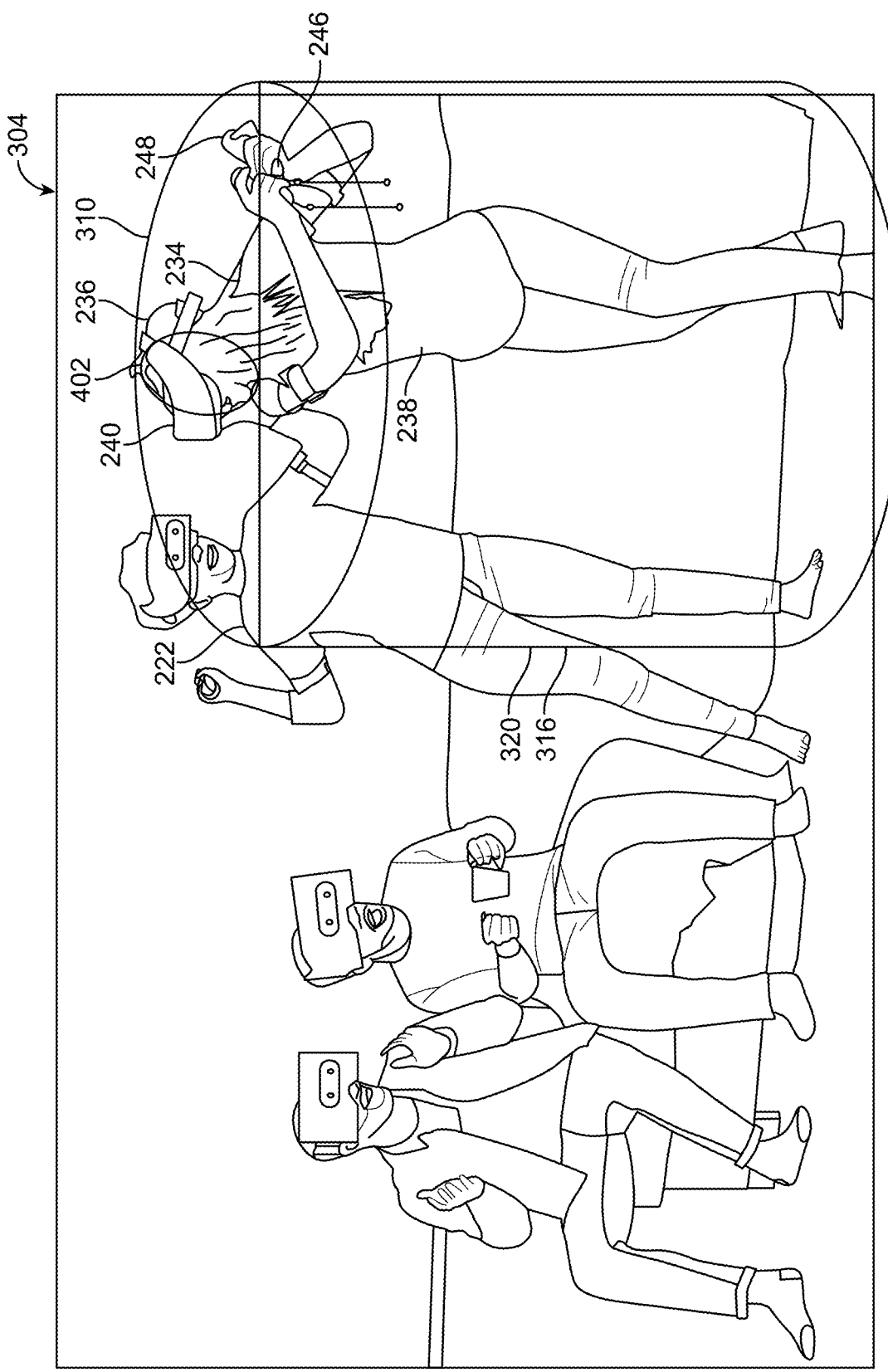
FIG. 4 is a drawing illustrating an image of the scene of FIG. 2A to illustrate various concepts described with regard to the system of FIG. 2A and FIG. 2B and/or the device of FIG. 3, according to various aspects of the present disclosure.

FIG. 4 is a drawing illustrating an image 304 of scene 202 of FIG. 2A to illustrate various concepts described with regard to system 200 of FIG. 2A and FIG. 2B and/or device 300 of FIG. 3, according to various aspects of the present disclosure. Pose information 306 may be an example of an image captured and used according to the systems and techniques. For example (despite the perspective), image 304 may be an example of image 252 as described with relation to head-mounted device 208 and person 234. For example, image 304 may be an example of an image captured by head-mounted device 208 of person 234. Alternatively, image 304 may be an example of an image of the scene 202 of FIG. 2A captured by another device.

Figure 5:
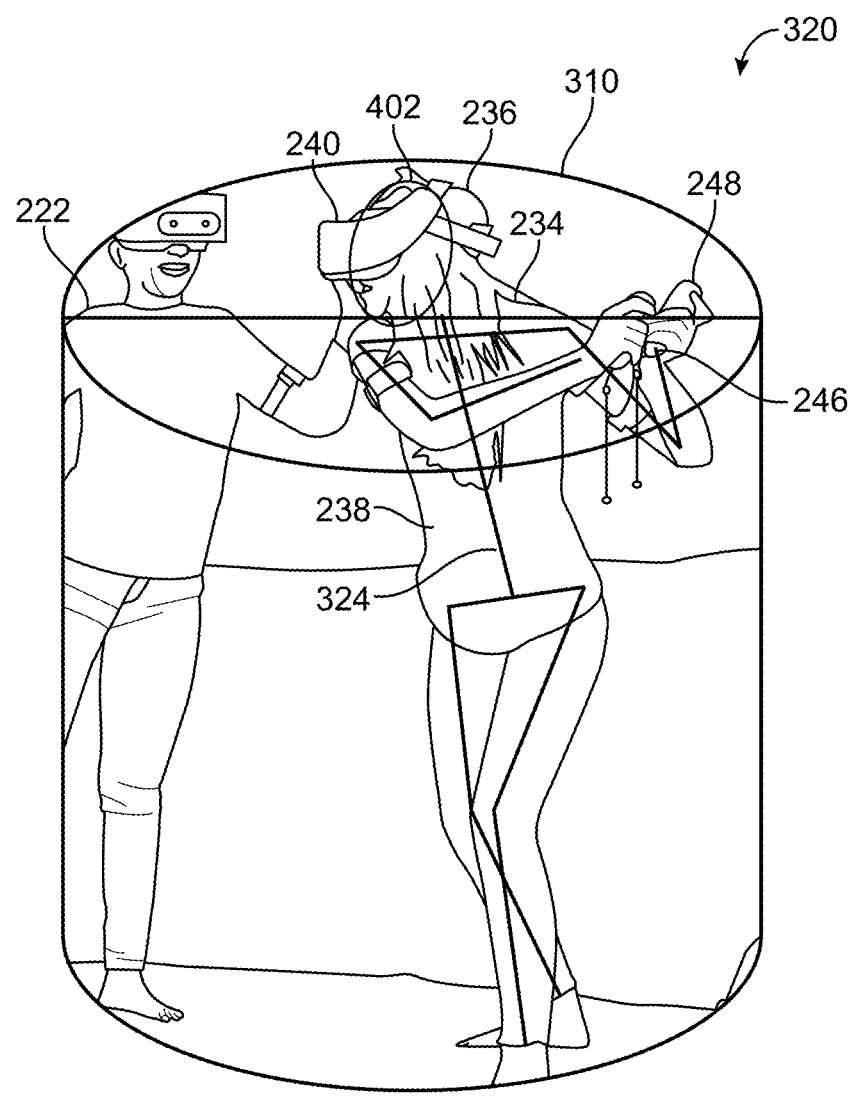
FIG. 5 is a drawing illustrating a search region of an image to illustrate various concepts described with regard to the system of FIG. 2A and FIG. 2B and/or the device of FIG. 3, according to various aspects of the present disclosure.

FIG. 5 is a drawing illustrating a search region 320 of an image (e.g., of image 304) to illustrate various concepts described with regard to system 200 of FIG. 2A and FIG. 2B and/or device 300 of FIG. 3, according to various aspects of the present disclosure. Search region 320 may be an example of a search region of an image captured and used according to the systems and techniques. For example (despite the perspective), search region 320 may be an example of a search region of image 252 as described with relation to head-mounted device 208 and person 234. For example, search region 320 may be an example of a search region of image captured by head-mounted device 208 of person 234. Alternatively, search region 320 may be an example of a search region of an image of scene 202 of FIG. 2A captured by another device.

Turning to FIG. 3, a camera 302 of device 300 (which may be the same as, or may be substantially similar to, image sensor 102 of FIG. 1 of XR system 100) may capture image 304. Image 304 may include person 234. In other words, image 304 may include pixels representative of person 234.

Device 300 may receive pose information 306, which may be indicative of a head pose 402 (as illustrated by FIG. 4) of head 236 of person 234. For example, person 234 may wear head-mounted device 240 on a head 236 of person 234. Head-mounted device 240 may determine head pose 402 of head 236 of person 234 (e.g., based on data from an accelerometer, a gyroscope, and/or an IMU, and/or using a SLAM technique based on images captured by head-mounted device 240). Head-mounted device 240 may transmit pose information 306 to device 300 As an example, device 300 may be an example of head-mounted device 208 and head-mounted device 240 may transmit pose information 244 to head-mounted device 208 (e.g., as described with regard to FIG. 2B).

A bounding-volume generator 308 of device 300 may generate a bounding volume 310 based on head pose 402 as received in pose information 244. Bounding volume 310 may be a three-dimensional volume in a three-dimensional coordinate system of device 300. In some cases, bounding volume 310 may be in a common reference system shared by device 300 and head-mounted device 240 and/or others of head-mounted device 208, head-mounted device 216, and head-mounted device 228.

Bounding-volume generator 308 may generate bounding volume 310 based on head pose 402. For example, bounding-volume generator 308 may generate bounding volume 310 to be below head pose 402. Further, in some aspects, bounding-volume generator 308 may generate bounding volume 310 based on SLAM techniques (e.g., based on ground and/or walls as defined by the SLAM techniques). Further, bounding-volume generator 308 may generate bounding volume 310 based on predetermined parameters based on a human body. For example, bounding-volume generator 308 may generate bounding volume 310 to have a one-meter lateral extent based on an arm-length parameter. Bounding volume 310 is illustrated in FIG. 4 as a cylinder. Bounding volume 310 may have any shape. For example, bounding volume 310 may be a cylinder, a sphere, a box, a blob, a mesh, etc.

A bounding-volume projector 312 of device 300 may generate a mask 316 based on bounding volume 310. For example, bounding-volume projector 312 may project the three-dimensional bounding volume 310 onto an image plane (e.g., an image plane of image 304). Because FIG. 4 is a two-dimensional image, the outer boundaries of bounding volume 310 as it appears in FIG. 4 may represent the outer boundaries of bounding volume 310 as projected into the image plane. Bounding-volume projector 312 may generate mask 316 based on bounding volume 310 as projected onto the image plane. For example, bounding-volume projector 312 may generate mask 316 to correspond to an outer boundary of bounding volume 310 as projected onto image 304. Thus, mask 316 may be two-dimensional and correspond to the outer boundaries of bounding volume 310 as projected onto image 304. Further, mask 316 may correspond to a position of person 234 in image 304. For example, mask 316 may define pixels of image 304 which may represent person 234. For example, because bounding volume 310 is defined based on parameters of the human body and head pose 402, and because bounding volume 310 is the projection of bounding volume 310 onto image 304, mask 316 may indicate pixels of image 304 that represent body 238 of person 234.

A mask applier 318 of device 300 may apply mask 316 to image 304 to generate a search region 320. Search region 320 may be a portion of image 304 as defined by mask 316 (e.g., as illustrated by a comparison between FIG. 4 and FIG. 5). Search region 320, being defined by mask 316, may include pixels representative of person 234.

A pose estimator 322 of device 300 may estimate a pose 324 of body 238 of person 234 based on search region 320. For example, pose estimator 322 may be a trained pose-estimation model. More specifically, pose estimator 322 may be trained to receive images of bodies and determine poses of the bodies based the images. Pose 324 may include poses of various parts of body 238 of person 234 in six degrees of freedom. Pose 324 is illustrated in FIG. 5 as including a number of lines corresponding to shoulders, a torso, hips, arms, and legs of person 234. Because FIG. 5 is a two-dimensional image, pose 324 appears two-dimensional in FIG. 5, however, pose 324 may be three-dimensional according to the three-dimensional coordinate system of device 300 (which may be shared by head-mounted device 240).

Device 300 may output pose 324. Device 300 (which may be one of head-mounted device 208, head-mounted device 216, or head-mounted device 228), or another device, may use pose 324 for various purposes including, as examples, as input and/or for extended reality (XR) purposes. For example, device 300 may track pose 324 of body 238 of person 234 and use pose 324 as an input (e.g., to control a character in a game). Additionally or alternatively, an XR device (e.g., head-mounted device 208) may track pose 324 and overlay body 238 of person 234 with generated content in a field of view of user 204.

In some aspects, device 300 may include a validator 326 which may validate pose 324 using pose information 306. For example, validator 326 may receive pose 324 from pose estimator 322 and pose information 306 (e.g., from head-mounted device 240) and validate pose 324 based on pose information 306. For example, validator 326 may determine an accuracy of pose 324 based on pose information 306. For example, validator 326 may know head pose 402 of head 236 in the three-dimensional coordinate system of device 300 based on pose information 306. Validator 326 may validate pose 324 of body 238 of person 234 in the three-dimensional coordinate system of device 300 based on head pose 402. In some aspects, validator 326 may generate a confidence value 328 indicative based on the correctness of pose 324. Device 300 may output confidence value 328 (e.g., with pose 324).

As mentioned previously, according to various aspects of the present disclosure, a device (e.g., device 300) may determine pose 324 of person 234 based on a pose of hand-held device 248. For example, as described previously, head-mounted device 240 may determine a pose of hand-held device 248 (e.g., based on movement data 254 generated by sensors of hand-held device 248 and/or based on images of hand-held device 248 captured by head-mounted device 240). Head-mounted device 240 may provide the pose of hand-held device 248 to device 300 and device 300 may determine pose 324 based, at least in part, on the pose of hand-held device 248. For example, bounding-volume generator 308 may determine bounding volume 310 based at least in part on the pose of hand-held device 248. For example, bounding-volume generator 308 may generate bounding volume 310 to include hand-held device 248 and, in cases in which bounding volume 310 has pose information for two hand-held devices, bounding volume 310 may generate bounding volume 310 to exclude space where the two hand-held devices are not. The remainder of the operations described with relation to device 300 of FIG. 3 may proceed as described above based on the bounding volume 310 generated based on the pose of hand-held device 248.

By generating pose 324 based on search region 320 (rather than image 304), pose estimator 322 may generate pose 324 faster (e.g., consuming less time and/or power) than if pose estimator 322 were to generate pose 324 based on image 304. Thus, device 300 may conserve time and/or power when generating pose 324. Further, by generating pose 324 based on search region 320 (rather than image 304), pose estimator 322 may conserve time and/or power by not determining a pose of person 212. For example, the system which captured image 304 may determine that user 204 and/or person 212 are not of interest (e.g., based on user 204 and/or person 212 not wearing a head-mounted device, contrary to what is illustrated in FIG. 2A and FIG. 4 or based on some other factor, such as user input).

Figure 6:
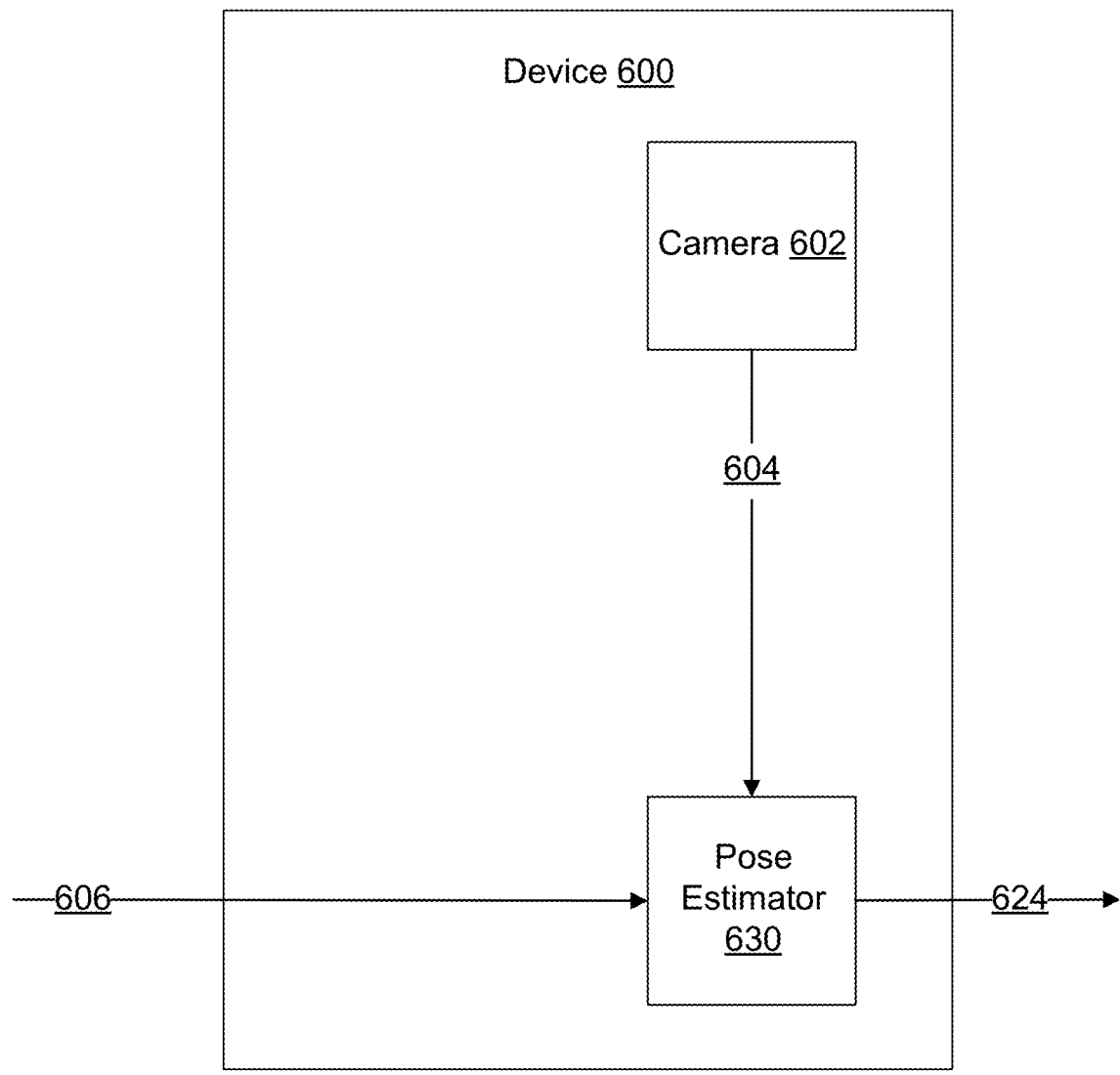
FIG. 6 is a block diagram of device for determining a pose of a body of a person, according to various aspects of the present disclosure.

FIG. 6 is a block diagram of device 600 for determining a pose 624 of a body (e.g., body 238) of a person (e.g., person 234), according to various aspects of the present disclosure. Device 600 of FIG. 6 is provided as an example of implementing the systems and techniques of the present disclosure. Device 600 may be an example of head-mounted device 208, head-mounted device 216, head-mounted device 228. Additionally or alternatively, device 600 may be an example of another device or system (e.g., a computing device including a camera or a gaming system including a camera). Head-mounted device 208, head-mounted device 216, head-mounted device 228, and/or head-mounted device 228 and or the aforementioned other device or system may include elements substantially similar to, or the same as, the elements described with regard to device 600 and FIG. 6. Further, head-mounted device 208, head-mounted device 216, head-mounted device 228, and head-mounted device 240, and/or the other aforementioned device or system may perform the operations described with regard to device 600 and FIG. 6. For example, a gaming system including a camera or a computing system including a camera may include the elements described with regard to device 600 of FIG. 6 and may perform the operations described with regard to FIG. 6.

A camera 602 of device 600 (which may be the same as, or may be substantially similar to, image sensor 102 of FIG. 1 of XR system 100) may capture image 604. Image 604 may include a person (e.g., person 234). In other words, image 604 may include pixels representative of the person.

Device 600 may receive pose information 606, which may be indicative of a head pose (e.g., head pose 402 of FIG. 4). For example, the person may wear a head-mounted device (e.g., head-mounted device 240). The head-mounted device may determine the head pose (e.g., based on data from an accelerometer, a gyroscope, and/or an IMU, and/or using a SLAM technique based on images captured by the head-mounted device). The head-mounted device may transmit pose information 606 to device 600. As an example, device 600 may be an example of head-mounted device 208 and head-mounted device 240 may transmit pose information 244 to head-mounted device 208 (e.g., as described with regard to FIG. 2B).

In some aspects, pose information 606 may further include hand pose of the person. For example, the head-mounted device may be associated with a hand-held device and may determine a hand pose-held device (e.g., based on an IMU of the hand-held device and/or based on images of the hand-held device captured by the head-mounted device). The head-mounted device may transmit the hand pose-held device to device 600 (e.g., in pose information 606).

A pose estimator 630 of device 600 may determine pose 624 of the person based on image 604 and pose information 606. Pose 624 may be the same as, or may be substantially similar to, pose 324 of FIG. 3 and FIG. 5. Pose estimator 630 may be a machine-learning model trained to determine poses of bodies based on images of the bodies and based on head poses. As an example, the pose estimator 630 may be trained by being provided with images and head poses. Pose estimator 630 may generate body poses based on the images and head poses. The body poses generated pose estimator 630 may be compared with ground truth body poses corresponding to the images and head poses. Parameters (e.g., weights) of pose estimator 630 may be adjusted based on a difference (e.g., error) between the body poses generated by pose estimator 630 and the ground truth body poses. After being trained (e.g., using many images, head poses, and corresponding ground truth body poses), pose estimator 630 may be deployed in device 600 and may be used to infer pose 624 based on image 604 and pose information 606.

Figure 7:
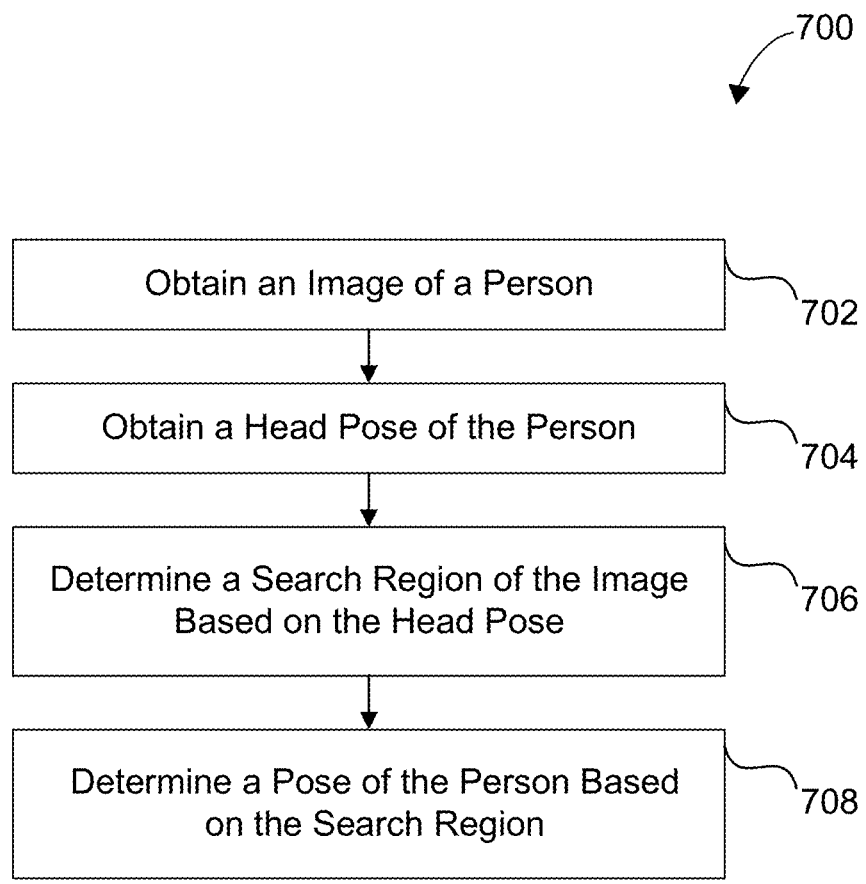
FIG. 7 is a flow diagram illustrating another example process for estimating body poses, in accordance with aspects of the present disclosure.

FIG. 7 is a flow diagram illustrating a process 700 for estimating body poses, in accordance with aspects of the present disclosure. One or more operations of process 700 may be performed by a computing device (or apparatus) or a component (e.g., a chipset, codec, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, a desktop computing device, a tablet computing device, a server computer, a robotic device, and/or any other computing device with the resource capabilities to perform the process 700. The one or more operations of process 700 may be implemented as software components that are executed and run on one or more processors.

At a block 702, a computing device (or one or more components thereof) may obtain an image of a person. For example, head-mounted device 208 of system 200 may image 252 of person 234.

At a block 704, the computing device (or one or more components thereof) may obtain a head pose of the person. For example, head-mounted device 208 a head pose of head 236 of person 234.

In some aspects, the head pose of the person may be determined by a head-mounted device on a head of the person. For example, head-mounted device 240 on head 236 of person 234 may determine the head pose of person 234.

In some aspects, the head pose of the person may be determined based on at least one of movement data from one or more inertial measurement units (IMUs) of the head-mounted device or a simultaneous localization and mapping (SLAM) technique based on images captured at the head-mounted device. For example, head-mounted device 240 on head 236 of person 234 may include IMUs and may determine the head pose of head 236 of person 234. Additionally or alternatively, head-mounted device 240 may perform a SLAM technique and determine a head pose of head 236 using the SLAM technique.

In some aspects, to obtain the head pose, the computing device (or one or more components thereof) may receive the head pose from a head-mounted device on a head of the person. For example, head-mounted device 208 may receive the head pose of head 236 from head-mounted device 240.

In some aspects, the computing device (or one or more components thereof) may determine a head pose of a user and transmit the head pose of the user. For example, head-mounted device 208 may determine a head pose of head 206 of user 204 and transmit the head pose, for example, to other HMDs in system 200. By transmitting the head pose of head 206 of user 204, head-mounted device 208 may enable other HMDs of system 200 to determine a pose of user 204, for example, using process 700.

In some aspects, the head pose of the user may be determined based on at least one of movement data from one or more inertial measurement units (IMUs) of a head-mounted device on a head of the user or a simultaneous localization and mapping (SLAM) technique based on images captured at the head-mounted device. For example, head-mounted device 208 on head 206 of user 204 may include IMUs and may determine the head pose of head 206 of user 204.

Additionally or alternatively, head-mounted device 208 may perform a SLAM technique and determine a head pose of head 206 using the SLAM technique.

At a block 706, the computing device (or one or more components thereof) may determine a search region of the image based on the head pose. For example, head-mounted device 208 may determine search region 320 of image 304 based on the head pose of head 236 of person 234.

At a block 708, the computing device (or one or more components thereof) may determine a pose of the person based on the search region. For example, head-mounted device 208 may determine pose 324 of person 234 based on search region 320 of image 304.

In some aspects, the computing device (or one or more components thereof) may determine a bounding volume for a body of the person based on the head pose of the person. The pose of the person may be determined further based on the bounding volume. For example, head-mounted device 208 may determine bounding volume 310 based on the head pose of head 236 of person 234. Head-mounted device 208 may determine pose 324 of person 234 based on bounding volume 310.

In some aspects, the computing device (or one or more components thereof) may determine a mask for the image based on the bounding volume. The mask may be associated with a position of the person in the image. The pose of the person may be determined further based on the mask. For example, head-mounted device 208 may determine mask 316 for image 304 based on bounding volume 310. Bounding volume 310 may be associated with a position of person 234 in image 304 (e.g., based on bounding volume 310 having been determined based on a head pose of head 236 of person 234). Head-mounted device 208 may determine pose 324 of person 234 based on mask 316.

In some aspects, to determine the mask, the computing device (or one or more components thereof) may project the bounding volume onto the image and define the mask based on a two-dimensional projection of the bounding volume on the image. For example, head-mounted device 208 may project bounding volume 310 onto image 304 and define mask 316 as the two-dimensional projection of bounding volume 310 on image 304.

In some aspects, to determine the pose of the person, the computing device (or one or more components thereof) may determine the pose of the person based on the search region of the image. The search region is defined by the mask. For example, search region 320 may be defined by mask 316. Head-mounted device 208 may determine pose 324 of person 234 based on search region 320.

In some aspects, the pose of the person may be determined using a pose-estimation machine-learning model trained to determine poses based on images. For example, device 300 may determine pose 324 using a pose estimator 322 which may be trained to determine poses based on images.

In some aspects, the pose of the person may be determined using a pose-estimation machine-learning model trained to determine poses based on images. The computing device (or one or more components thereof) may provide the head pose to the pose-estimation machine-learning model as a prior. For example, device 300 may determine pose 324 using a pose estimator 322 which may be trained to determine poses based on images. Further, head-mounted device 208 may provide a head pose of head 236 of person 234 to pose estimator 322 as a prior.

In some aspects, the computing device (or one or more components thereof) may determine a confidence value for the pose of the person based on a comparison between the pose of the person and the head pose of the person wherein the confidence value is associated with a confidence for using the pose of the person. For example, device 300 may include a validator 326 that may determine a confidence value 328 based on a head pose of head 236 and pose 324. For example, validator 326 may determine confidence value 328 based on a comparison between a torso of pose 324 and the head pose.

In some aspects, the computing device (or one or more components thereof) may obtain a hand pose of the person. The pose of the person may be determined further based on the hand pose. For example, head-mounted device 208 may obtain a hand pose of hand 246 of person 234. Head-mounted device 208 may determine pose 324 of person 234 based on the hand pose of hand 246.

In some aspects, the hand pose of the person may be determined by a head-mounted device on a head of the person. For example, the hand pose of head 236 of person 234 may be determined by head-mounted device 240 that may be worn on head 236 of person 234. In some aspects, the hand pose of the person may be determined based on at least one of hand-tracking technique based on one or more of images captured at the head-mounted device or movement data from inertial measurement units (IMUs) in a handheld device in a hand of the person. For example, head-mounted device 240 may capture image 252 of hand 246 of person 234 and determine the hand pose of hand 246 based on image 252. Additionally or alternatively, hand 246 may hold hand-held device 248. Hand-held device 248 may include IMUs. Hand-held device 248 may provide movement data 254 to head-mounted device 240 and head-mounted device 240 may determine the hand pose of hand 246 based on movement data 254.

In some aspects, the computing device (or one or more components thereof) may determine a bounding volume for a body of the person based on the head pose of the person and the hand pose of the person. The pose of the person may be determined further based on the bounding volume. For example, head-mounted device 208 may determine bounding volume 310 based on the head pose of head 236 of person 234 and/or based on the hand pose of hand 246 of person 234. Head-mounted device 208 may further determine pose 324 of person 234 based on bounding volume 310.

In some aspects, the pose of the person may be determined using a pose-estimation machine-learning model trained to determine poses based on images. The computing device (or one or more components thereof) may provide the hand pose to the pose-estimation machine-learning model as a prior. For example, device 300 may determine pose 324 using a pose estimator 322 which may be trained to determine poses based on images. Further, head-mounted device 208 may provide a hand pose of hand 246 of person 234 to pose estimator 322 as a prior.

In some aspects, the pose of the person may be determined using a pose-estimation machine-learning model trained to determine poses based on images and wherein the at least one processor is further configured to determine an upper-body pose based on the hand pose using inverse kinematics and providing the upper-body pose to the pose-estimation machine-learning model as a prior. For example, device 300 may determine pose 324 using a pose estimator 322 which may be trained to determine poses based on images. Device 300 may further determine an upper-body pose of body 238 of person 234 based on the hand pose using inverse kinematics. Further, head-mounted device 208 may provide a hand pose of hand 246 of person 234 to pose estimator 322 as a prior.

In some aspects, the computing device (or one or more components thereof) may determine a confidence value for the pose of the person based on a comparison between the pose of the person and the hand pose of the person. For example, device 300 may include a validator 326 that may determine a confidence value 328 based on a hand pose of hand 246 and pose 324. For example, validator 326 may determine confidence value 328 based on a comparison between hands or arms of pose 324 and the hand pose.

In some aspects, the pose of the person may be determined using a pose-estimation machine-learning model trained to determine poses based on images and head poses. For example, device 600 may determine pose 624 of pose 324 based on image 604 of person 234 and pose information 606 (which may include a head pose of head 236 of person 234).

In some aspects, the computing device (or one or more components thereof) may obtain a hand pose of the person. The pose-estimation machine-learning model may be trained to determine poses based on images, head poses, and hand poses. The pose of the person may be determined further based on the hand pose. For example, device 600 may determine pose 624 of pose 324 based on image 604 of person 234 and pose information 606 (which may include a head pose of head 236 of person 234 and a hand pose of hand 246 of person 234).

In some examples, as noted previously, the methods described herein (e.g., process 700 of FIG. 7, and/or other methods described herein) can be performed, in whole or in part, by a computing device or apparatus. In one example, one or more of the methods can be performed by XR system 100 of FIG. 1, system 200 of FIG. 2A, head-mounted device 208 of FIG. 2A and FIG. 2B, head-mounted device 216 of FIG. 2A and FIG. 2B, head-mounted device 228 of FIG. 2A and FIG. 2B, head-mounted device 240 of FIG. 2A and FIG. 2B, device 300 of FIG. 3, or by another system or device. In another example, one or more of the methods (e.g., process 700 of FIG. 7, and/or other methods described herein) can be performed, in whole or in part, by the computing-device architecture 1000 shown in FIG. 10. For instance, a computing device with the computing-device architecture 1000 shown in FIG. 10 can include, or be included in, the components of the XR system 100 of FIG. 1, system 200 of FIG. 2A, head-mounted device 208 of FIG. 2A and FIG. 2B, head-mounted device 216 of FIG. 2A and FIG. 2B, head-mounted device 228 of FIG. 2A and FIG. 2B, head-mounted device 240 of FIG. 2A and FIG. 2B, device 300 of FIG. 3 and can implement the operations of process 700, and/or other process described herein. In some cases, the computing device or apparatus can include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device can include a display, a network interface configured to communicate and/or receive the data, any combination thereof, and/or other component(s). The network interface can be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 700, and/or other process described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 700, and/or other process described herein can be performed under the control of one or more computer systems configured with executable instructions and can be implemented as code (e.g., executable instructions, one or more computer programs, or one or more applications) executing collectively on one or more processors, by hardware, or combinations thereof. As noted above, the code can be stored on a computer-readable or machine-readable storage medium, for example, in the form of a computer program comprising a plurality of instructions executable by one or more processors. The computer-readable or machine-readable storage medium can be non-transitory.

As noted above, various aspects of the present disclosure can use machine-learning models or systems.

Figure 8:
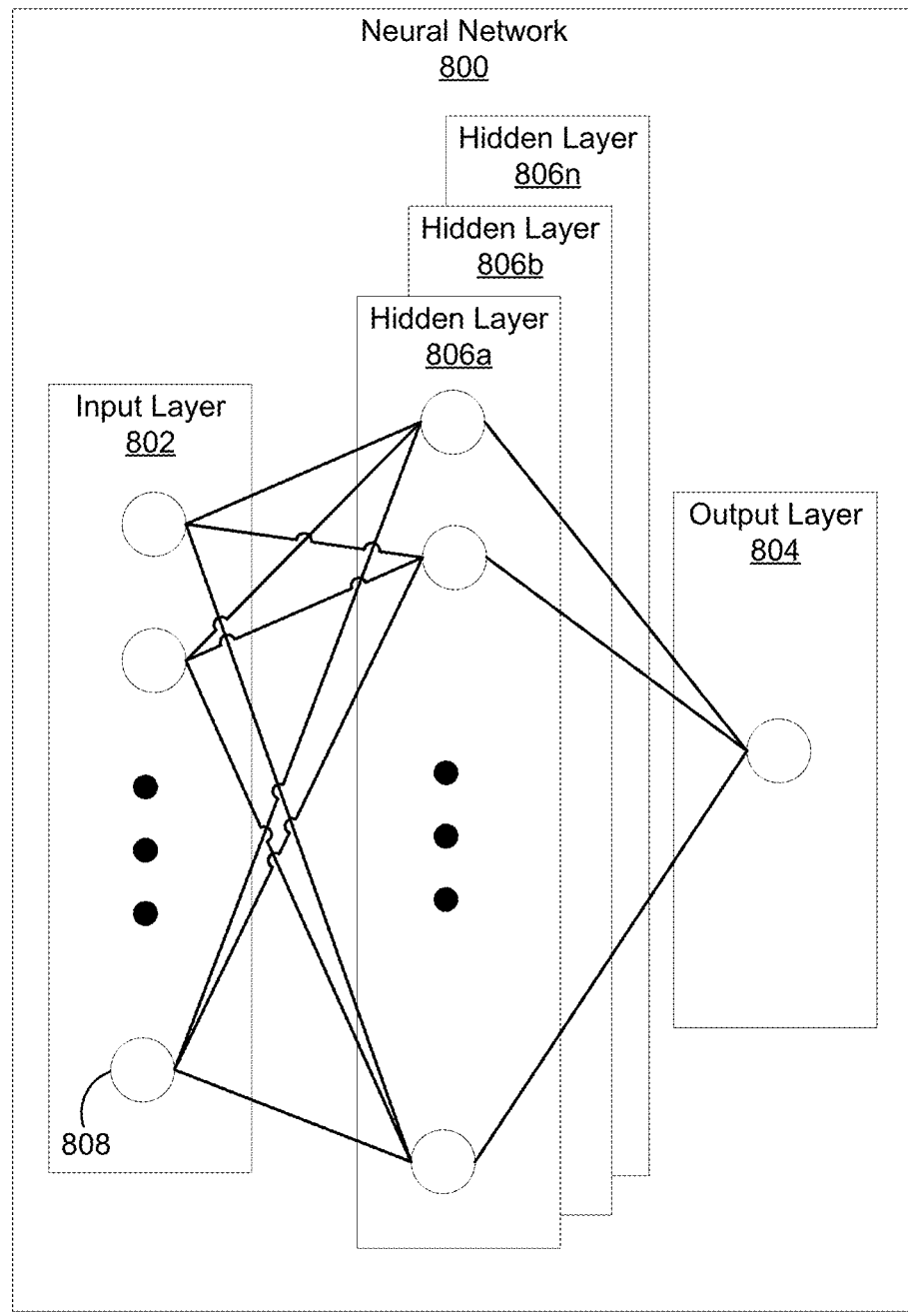
FIG. 8 is a block diagram illustrating an example of a deep learning neural network that can be used to implement a perception module and/or one or more validation modules, according to some aspects of the disclosed technology.

FIG. 8 is an illustrative example of a neural network 800 (e.g., a deep-learning neural network) that can be used to implement machine-learning based feature segmentation, implicit-neural-representation generation, rendering, classification, object detection, image recognition (e.g., face recognition, object recognition, scene recognition, etc.), feature extraction, authentication, gaze detection, gaze prediction, and/or automation. For example, neural network 800 may be an example of, or can implement, pose estimator 322 of FIG. 3 and/or pose estimator 630 of FIG. 6.

An input layer 802 includes input data. In one illustrative example, input layer 802 can include data representing search region 320 and/or image 604 and pose information 606. Neural network 800 includes multiple hidden layers hidden layers 806a, 806b, through 806n. The hidden layers 806a, 806b, through hidden layer 806n include "n" number of hidden layers, where "n" is an integer greater than or equal to one. The number of hidden layers can be made to include as many layers as needed for the given application. Neural network 800 further includes an output layer 804 that provides an output resulting from the processing performed by the hidden layers 806*a*, 806*b*, through 806*n*. In one illustrative example, output layer 804 can provide pose 324 and/or pose 624.

Neural network 800 may be, or may include, a multi-layer neural network of interconnected nodes. Each node can represent a piece of information. Information associated with the nodes is shared among the different layers and each layer retains information as information is processed. In some cases, neural network 800 can include a feed-forward network, in which case there are no feedback connections where outputs of the network are fed back into itself. In some cases, neural network 800 can include a recurrent neural network, which can have loops that allow information to be carried across nodes while reading in input.

Information can be exchanged between nodes through node-to-node interconnections between the various layers. Nodes of input layer 802 can activate a set of nodes in the first hidden layer 806*a*. For example, as shown, each of the input nodes of input layer 802 is connected to each of the nodes of the first hidden layer 806*a*. The nodes of first hidden layer 806*a* can transform the information of each input node by applying activation functions to the input node information. The information derived from the transformation can then be passed to and can activate the nodes of the next hidden layer 806*b*, which can perform their own designated functions. Example functions include convolutional, up-sampling, data transformation, and/or any other suitable functions. The output of the hidden layer 806*b* can then activate nodes of the next hidden layer, and so on. The output of the last hidden layer 806*n* can activate one or more nodes of the output layer 804, at which an output is provided. In some cases, while nodes (e.g., node 808) in neural network 800 are shown as having multiple output lines, a node has a single output and all lines shown as being output from a node represent the same output value.

In some cases, each node or interconnection between nodes can have a weight that is a set of parameters derived from the training of neural network 800. Once neural network 800 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 800 to be adaptive to inputs and able to learn as more and more data is processed.

Neural network 800 may be pre-trained to process the features from the data in the input layer 802 using the different hidden layers 806*a*, 806*b*, through 806*n* in order to provide the output through the output layer 804. In an example in which neural network 800 is used to identify features in images, neural network 800 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 800 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 800 is trained well enough so that the weights of the layers are accurately tuned.

For the example of identifying objects in images, the forward pass can include passing a training image through neural network 800. The weights are initially randomized before neural network 800 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 800, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 800 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total}=\Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 800 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w_i-\eta dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 800 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers.

Neural network 800 can include any other deep network other than a CNN, such as an autoencoder, a deep belief nets (DBNs), a Recurrent Neural Networks (RNNs), among others.

Figure 9:
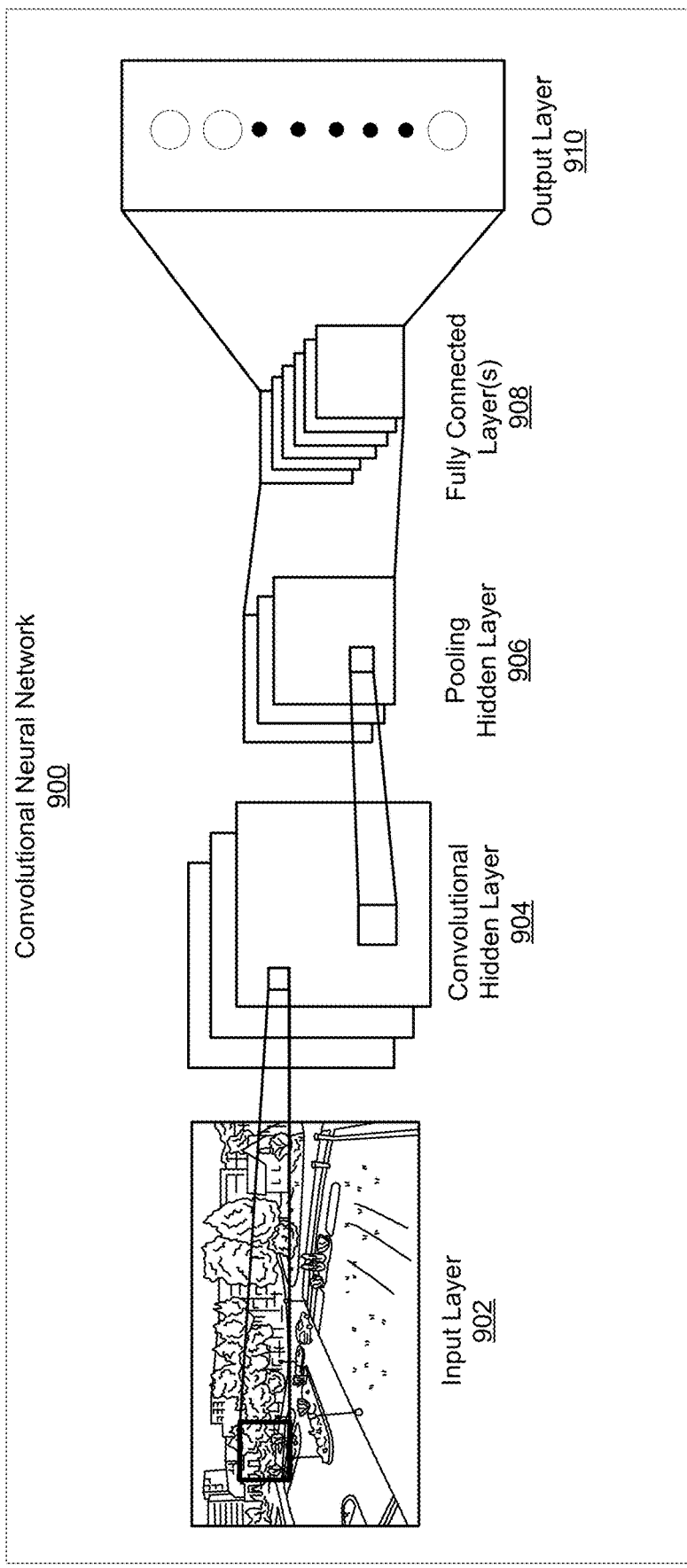
FIG. 9 is a block diagram illustrating an example of a convolutional neural network (CNN), according to various aspects of the present disclosure.

FIG. 9 is an illustrative example of a convolutional neural network (CNN) 900. The input layer 902 of the CNN 900 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 904, an optional non-linear activation layer, a pooling hidden layer 906, and fully connected layer 908 (which fully connected layer 908 can be hidden) to get an output at the output layer 910. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 can be the convolutional hidden layer 904. The convolutional hidden layer 904 can analyze image data of the input layer 902. Each node of the convolutional hidden layer 904 is connected to a region of nodes (pixels) of the input image called a receptive field. The convolutional hidden layer 904 can be considered as one or more filters (each filter corresponding to a different activation or feature map), with each convolutional iteration of a filter being a node or neuron of the convolutional hidden layer 904. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 904. Each connection between a node and a receptive field for that node learns a weight and, in some cases, an overall bias such that each node learns to analyze its particular local receptive field in the input image. Each node of the convolutional hidden layer 904 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 904 is due to each node of the convolutional layer being applied to its corresponding receptive field. For example, a filter of the convolutional hidden layer 904 can begin in the top-left corner of the input image array and can convolve around the input image. As noted above, each convolutional iteration of the filter can be considered a node or neuron of the convolutional hidden layer 904. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 904. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 904.

The mapping from the input layer to the convolutional hidden layer 904 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 904 can include several activation maps in order to identify multiple features in an image. The example shown in FIG. 9 includes three activation maps. Using three activation maps, the convolutional hidden layer 904 can detect three different kinds of features, with each feature being detectable across the entire image.

In some examples, a non-linear hidden layer can be applied after the convolutional hidden layer 904. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 900 without affecting the receptive fields of the convolutional hidden layer 904.

The pooling hidden layer 906 can be applied after the convolutional hidden layer 904 (and after the non-linear hidden layer when used). The pooling hidden layer 906 is used to simplify the information in the output from the convolutional hidden layer 904. For example, the pooling hidden layer 906 can take each activation map output from the convolutional hidden layer 904 and generates a condensed activation map (or feature map) using a pooling function. Max-pooling is one example of a function performed by a pooling hidden layer. Other forms of pooling functions be used by the pooling hidden layer 906, such as average pooling, L2-norm pooling, or other suitable pooling functions. A pooling function (e.g., a max-pooling filter, an L2-norm filter, or other suitable pooling filter) is applied to each activation map included in the convolutional hidden layer 904. In the example shown in FIG. 9, three pooling filters are used for the three activation maps in the convolutional hidden layer 904.

In some examples, max-pooling can be used by applying a max-pooling filter (e.g., having a size of 2×2) with a stride (e.g., equal to a dimension of the filter, such as a stride of 2) to an activation map output from the convolutional hidden layer 904. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 904 having a dimension of 24×24 nodes, the output from the pooling hidden layer 906 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 906 to every one of the output nodes in the output layer 910. Using the example above, the input layer includes 28×28 nodes encoding the pixel intensities of the input image, the convolutional hidden layer 904 includes 3×24×24 hidden feature nodes based on application of a 5×5 local receptive field (for the filters) to three activation maps, and the pooling hidden layer 906 includes a layer of 3×12×12 hidden feature nodes based on application of max-pooling filter to 2×2 regions across each of the three feature maps. Extending this example, the output layer 910 can include ten output nodes. In such an example, every node of the 3×12×12 pooling hidden layer 906 is connected to every node of the output layer 910.

The fully connected layer 908 can obtain the output of the previous pooling hidden layer 906 (which should represent the activation maps of high-level features) and determines the features that most correlate to a particular class. For example, the fully connected layer 908 can determine the high-level features that most strongly correlate to a particular class and can include weights (nodes) for the high-level features. A product can be computed between the weights of the fully connected layer 908 and the pooling hidden layer 906 to obtain probabilities for the different classes. For example, if the CNN 900 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 910 can include an M-dimensional vector (in the prior example, M=10). M indicates the number of classes that the CNN 900 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 10:
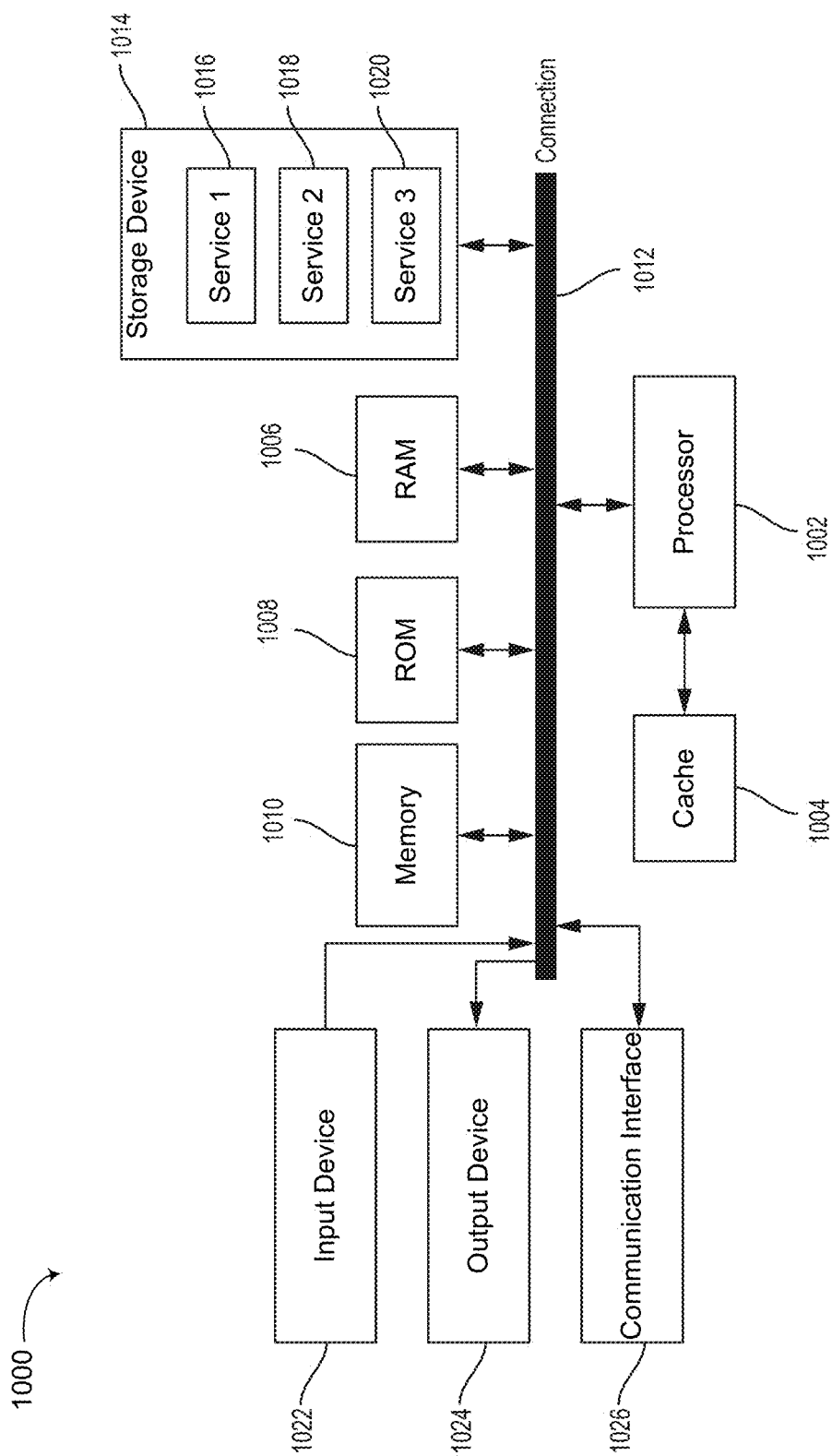
FIG. 10 is a block diagram illustrating an example computing-device architecture of an example computing device which can implement the various techniques described herein.

FIG. 10 illustrates an example computing-device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing-device architecture 1000 may include, implement, or be included in any or all of XR system 100 of FIG. 1, system 200 of FIG. 2A, head-mounted device 208 of FIG. 2A and FIG. 2B, head-mounted device 216 of FIG. 2A and FIG. 2B, head-mounted device 228 of FIG. 2A and FIG. 2B, head-mounted device 240 of FIG. 2A and FIG. 2B, device 300 of FIG. 3, device 600 of FIG. 6. Additionally or alternatively, computing-device architecture 1000 may be configured to perform process 700, and/or other process described herein.

The components of computing-device architecture 1000 are shown in electrical communication with each other using connection 1012, such as a bus. The example computing-device architecture 1000 includes a processing unit (CPU or processor) 1002 and computing device connection 1012 that couples various computing device components including computing device memory 1010, such as read only memory (ROM) 1008 and random-access memory (RAM) 1006, to processor 1002.

Computing-device architecture 1000 can include a cache of high-speed memory connected directly with, in close proximity to, or integrated as part of processor 1002.

Computing-device architecture 1000 can copy data from memory 1010 and/or the storage device 1014 to cache 1004 for quick access by processor 1002. In this way, the cache can provide a performance boost that avoids processor 1002 delays while waiting for data. These and other modules can control or be configured to control processor 1002 to perform various actions. Other computing device memory 1010 may be available for use as well. Memory 1010 can include multiple different types of memory with different performance characteristics. Processor 1002 can include any general-purpose processor and a hardware or software service, such as service 1 1016, service 2 1018, and service 3 1020 stored in storage device 1014, configured to control processor 1002 as well as a special-purpose processor where software instructions are incorporated into the processor design. Processor 1002 may be a self-contained system, containing multiple cores or processors, a bus, memory controller, cache, etc. A multi-core processor may be symmetric or asymmetric.

To enable user interaction with the computing-device architecture 1000, input device 1022 can represent any number of input mechanisms, such as a microphone for speech, a touch-sensitive screen for gesture or graphical input, keyboard, mouse, motion input, speech and so forth. Output device 1024 can also be one or more of a number of output mechanisms known to those of skill in the art, such as a display, projector, television, speaker device, etc. In some instances, multimodal computing devices can enable a user to provide multiple types of input to communicate with computing-device architecture 1000. Communication interface 1026 can generally govern and manage the user input and computing device output. There is no restriction on operating on any particular hardware arrangement and therefore the basic features here may easily be substituted for improved hardware or firmware arrangements as they are developed.

Storage device 1014 is a non-volatile memory and can be a hard disk or other types of computer readable media which can store data that are accessible by a computer, such as magnetic cassettes, flash memory cards, solid state memory devices, digital versatile disks, cartridges, random-access memories (RAMs) 1006, read only memory (ROM) 1008, and hybrids thereof. Storage device 1014 can include services 1016, 1018, and 1020 for controlling processor 1002. Other hardware or software modules are contemplated. Storage device 1014 can be connected to the computing device connection 1012. In one aspect, a hardware module that performs a particular function can include the software component stored in a computer-readable medium in connection with the necessary hardware components, such as processor 1002, connection 1012, output device 1024, and so forth, to carry out the function.

In block 1102, routine 1100 obtains an image of a person. In block 1104, routine 1100 obtains a head pose of the person. In block 1106, routine 1100 determines a search region of the image based on the head pose. In block 1108, routine 1100 determines a pose of the person based on the search region.

In some aspects, body pose estimation can be used to determine a good prior for the visual positioning system (VPS) localization. For example, head-mounted device 208 may obtain an image of person 234. Head-mounted device 208 may determine pose 324 of person 234 based on the image using a pose-estimation technique. Further head-mounted device 208 may provide pose 324 of person 234 to head-mounted device 240 of person 234. Head-mounted device 240 may use pose 324 of person 234 as a prior to determine a position of the person. Determining the position of person 234 may include determining the location and/or orientation of person 234 relative to scene 202. Head-mounted device 240 may determine the position of person 234 further based on VPS localization, for example, based on movement data from one or more inertial measurement units (IMUs) of head-mounted device 240 and/or a simultaneous localization and mapping (SLAM) technique based on images captured at head-mounted device 240.

The term "substantially," in reference to a given parameter, property, or condition, may refer to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks including devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, magnetic or optical disks, USB devices provided with non-volatile memory, networked storage devices, any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general-purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium including program code including instructions that, when executed, performs one or more of the methods described above. The computer-readable data storage medium may form part of a computer program product, which may include packaging materials. The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general-purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1. An apparatus for pose estimation of a person, the apparatus comprising: at least one memory; and at least one processor coupled to the at least one memory and configured to: obtain an image of the person; obtain a head pose of the person; determine a search region of the image based on the head pose; and determine a pose of the person based on the search region.

Aspect 2. The apparatus of aspect 1, wherein the at least one processor is further configured to determine a bounding volume for a body of the person based on the head pose of the person, and wherein the pose of the person is determined further based on the bounding volume.

Aspect 3. The apparatus of aspect 2, wherein the at least one processor is further configured to determine a mask for the image based on the bounding volume, wherein the mask is associated with a position of the person in the image, and wherein the pose of the person is determined further based on the mask.

Aspect 4. The apparatus of aspect 3, wherein, to determine the mask, the at least one processor is configured to project the bounding volume onto the image and define the mask based on a two-dimensional projection of the bounding volume on the image.

Aspect 5. The apparatus of any one of aspects 3 or 4, wherein, to determine the pose of the person, the at least one processor is configured to determine the pose of the person based on the search region of the image and wherein the search region is defined by the mask.

Aspect 6. The apparatus of aspect 5, wherein the pose of the person is determined using a pose-estimation machine-learning model trained to determine poses based on images.

Aspect 7. The apparatus of any one of aspects 1 to 6, wherein the pose of the person is determined using a pose-estimation machine-learning model trained to determine poses based on images, and wherein the at least one processor is further configured to provide the head pose to the pose-estimation machine-learning model as a prior.

Aspect 8. The apparatus of any one of aspects 1 to 7, wherein the at least one processor is further configured to obtain a hand pose of the person, wherein the pose of the person is determined further based on the hand pose.

Aspect 9. The apparatus of aspect 8, wherein the hand pose of the person is determined by a head-mounted device on a head of the person.

Aspect 10. The apparatus of aspect 9, wherein the hand pose of the person is determined based on at least one of hand-tracking technique based on one or more of images captured at the head-mounted device or movement data from inertial measurement units (IMUs) in a handheld device in a hand of the person.

Aspect 11. The apparatus of any one of aspects 8 to 10, wherein the at least one processor is further configured to determine a bounding volume for a body of the person based on the head pose of the person and the hand pose of the person, wherein the pose of the person is determined further based on the bounding volume.

Aspect 12. The apparatus of aspect 11, wherein the at least one processor is further configured to determine a mask for the image based on the bounding volume, wherein the mask is associated with a position of the person in the image, wherein the pose of the person is determined further based on the mask.

Aspect 13. The apparatus of aspect 12, wherein, to determine the mask, the at least one processor is configured to project the bounding volume onto the image and define the mask based on a two-dimensional projection of the bounding volume on the image.

Aspect 14. The apparatus of any one of aspects 12 or 13, wherein, to determine the pose of the person, the at least one processor is configured to determine the pose of the person based on the search region of the image and wherein the search region is defined by the mask.

Aspect 15. The apparatus of aspect 14, wherein the pose of the person is determined using a pose-estimation machine-learning model trained to determine poses based on images.

Aspect 16. The apparatus of any one of aspects 8 to 15, wherein the pose of the person is determined using a pose-estimation machine-learning model trained to determine poses based on images and wherein the at least one processor is further configured to provide the hand pose to the pose-estimation machine-learning model as a prior.

Aspect 17. The apparatus of any one of aspects 8 to 16, wherein the pose of the person is determined using a pose-estimation machine-learning model trained to determine poses based on images and wherein the at least one processor is further configured to determine an upper-body pose based on the hand pose using inverse kinematics and providing the upper-body pose to the pose-estimation machine-learning model as a prior.

Aspect 18. The apparatus of any one of aspects 8 to 17, wherein the at least one processor is further configured to determine a confidence value for the pose of the person based on a comparison between the pose of the person and the hand pose of the person.

Aspect 19. The apparatus of any one of aspects 1 to 18, wherein the pose of the person is determined using a pose-estimation machine-learning model trained to determine poses based on images and head poses.

Aspect 20. The apparatus of aspect 19, wherein the at least one processor is further configured to obtain a hand pose of the person, wherein the pose-estimation machine-learning model is trained to determine poses based on images, head poses, and hand poses, and wherein the pose of the person is determined further based on the hand pose.

Aspect 21. The apparatus of any one of aspects 1 to 20, wherein the head pose of the person is determined by a head-mounted device on a head of the person.

Aspect 22. The apparatus of aspect 21, wherein the head pose of the person is determined based on at least one of movement data from one or more inertial measurement units (IMUs) of the head-mounted device or a simultaneous localization and mapping (SLAM) technique based on images captured at the head-mounted device.

Aspect 23. The apparatus of any one of aspects 1 to 22, wherein, to obtain the head pose the at least one processor is configured to receive the head pose from a head-mounted device on a head of the person.

Aspect 24. The apparatus of any one of aspects 1 to 23, wherein the at least one processor is further configured to determine a head pose of a user and transmit the head pose of the user.

Aspect 25. The apparatus of aspect 24, wherein the head pose of the user is determined based on at least one of movement data from one or more inertial measurement units (IMUs) of a head-mounted device on a head of the user or a simultaneous localization and mapping (SLAM) technique based on images captured at the head-mounted device.

Aspect 26. The apparatus of any one of aspects 1 to 25, wherein the at least one processor is further configured to determine a confidence value for the pose of the person based on a comparison between the pose of the person and the head pose of the person wherein the confidence value is associated with a confidence for using the pose of the person.

Aspect 27. A method for pose estimation of a person, the method comprising: obtaining an image of the person; obtaining a head pose of the person; determining a search region of the image based on the head pose; and determining a pose of the person based on the search region.

Aspect 28. The method of aspect 27, further comprising determining a bounding volume for a body of the person based on the head pose of the person, wherein the pose of the person is determined further based on the bounding volume.

Aspect 29. The method of aspect 28, further comprising determining a mask for the image based on the bounding volume, wherein the mask is associated with a position of the person in the image, and wherein the pose of the person is determined further based on the mask.

Aspect 30. The method of aspect 29, wherein determining the mask comprises projecting the bounding volume onto the image and defining the mask based on a two-dimensional projection of the bounding volume on the image.

Aspect 31. The method of any one of aspects 29 or 30, wherein determining the pose of the person comprises determining the pose of the person based on the search region of the image and wherein the search region is defined by the mask.

Aspect 32. The method of aspect 31, wherein the pose of the person is determined using a pose-estimation machine-learning model trained to determine poses based on images.

Aspect 33. The method of any one of aspects 27 to 32, wherein the pose of the person is determined using a pose-estimation machine-learning model trained to determine poses based on images, and further comprising providing the head pose to the pose-estimation machine-learning model as a prior.

Aspect 34. The method of any one of aspects 27 to 33, further comprising obtaining a hand pose of the person, wherein the pose of the person is determined further based on the hand pose.

Aspect 35. The method of aspect 34, wherein the hand pose of the person is determined by a head-mounted device on a head of the person.

Aspect 36. The method of aspect 35, wherein the hand pose of the person is determined based on at least one of hand-tracking technique based on one or more of images captured at the head-mounted device or movement data from inertial measurement units (IMUs) in a handheld device in a hand of the person.

Aspect 37. The method of any one of aspects 34 to 36, further comprising determining a bounding volume for a body of the person based on the head pose of the person and the hand pose of the person, wherein the pose of the person is determined further based on the bounding volume.

Aspect 38. The method of aspect 37, further comprising determining a mask for the image based on the bounding volume, wherein the mask is associated with a position of the person in the image, wherein the pose of the person is determined further based on the mask.

Aspect 39. The method of aspect 38, wherein determining the mask comprises projecting the bounding volume onto the image and defining the mask based on a two-dimensional projection of the bounding volume on the image.

Aspect 40. The method of any one of aspects 38 or 39, wherein determining the pose of the person comprises determining the pose of the person based on the search region of the image and wherein the search region is defined by the mask.

Aspect 41. The method of aspect 40, wherein the pose of the person is determined using a pose-estimation machine-learning model trained to determine poses based on images.

Aspect 42. The method of any one of aspects 34 to 41, wherein the pose of the person is determined using a pose-estimation machine-learning model trained to determine poses based on images and wherein the method further comprises providing the hand pose to the pose-estimation machine-learning model as a prior.

Aspect 43. The method of any one of aspects 34 to 42, wherein the pose of the person is determined using a pose-estimation machine-learning model trained to determine poses based on images and wherein the method further comprises determining an upper-body pose based on the hand pose using inverse kinematics and providing the upper-body pose to the pose-estimation machine-learning model as a prior.

Aspect 44. The method of any one of aspects 34 to 43, further comprising determining a confidence value for the pose of the person based on a comparison between the pose of the person and the hand pose of the person.

Aspect 45. The method of any one of aspects 27 to 44, wherein the pose of the person is determined using a pose-estimation machine-learning model trained to determine poses based on images and head poses.

Aspect 46. The method of aspect 45, further comprising obtaining a hand pose of the person, wherein the pose-estimation machine-learning model is trained to determine poses based on images, head poses, and hand poses, and wherein the pose of the person is determined further based on the hand pose.

Aspect 47. The method of any one of aspects 27 to 46, wherein the head pose of the person is determined by a head-mounted device on a head of the person.

Aspect 48. The method of aspect 47, wherein the head pose of the person is determined based on at least one of movement data from one or more inertial measurement units (IMUs) of the head-mounted device or a simultaneous localization and mapping (SLAM) technique based on images captured at the head-mounted device.

Aspect 49. The method of any one of aspects 27 to 48, wherein obtaining the head pose comprises receiving the head pose from a head-mounted device on a head of the person.

Aspect 50. The method of any one of aspects 27 to 49, further comprising determining a head pose of a user and transmitting the head pose of the user.

Aspect 51. The method of aspect 50, wherein the head pose of the user is determined based on at least one of movement data from one or more inertial measurement units (IMUs) of a head-mounted device on a head of the user or a simultaneous localization and mapping (SLAM) technique based on images captured at the head-mounted device.

Aspect 52. The method of any one of aspects 27 to 51, further comprising determining a confidence value for the pose of the person based on a comparison between the pose of the person and the head pose of the person wherein the confidence value is associated with a confidence for using the pose of the person.

Aspect 53. A method comprising: obtaining an image of a person; determining a pose of the person based on the image using a pose-estimation technique; and providing the pose of the person to a device of the person, wherein the device of the person uses the pose of the person as a prior to determine a position of the person, wherein the position of the person is further determined based at least one of movement data from one or more inertial measurement units (IMUs) of the device or a simultaneous localization and mapping (SLAM) technique based on images captured at the device.

Aspect 54. A system for training a pose-estimation model, the system comprising: a head-mounted device configured to determine poses of a head of a person; an image capture device configured to capture images of the person; and at least one processor configured to train a pose-estimation machine-learning model using the images as inputs and the poses as ground truth.

Aspect 55. A non-transitory computer-readable storage medium having stored thereon instructions that, when executed by at least one processor, cause the at least one processor to perform operations according to any of aspects 27 to 53.

Aspect 56. An apparatus for providing virtual content for display, the apparatus comprising one or more means for perform operations according to any of aspects 27 to 53.

What is claimed is:

1. An apparatus for pose estimation of a person, the apparatus comprising:
    at least one memory; and
    at least one processor coupled to the at least one memory and configured to:
        obtain an image of the person;
        obtain a head pose of the person;
        determine a search region of the image based on the head pose and predetermined human-body parameters; and
        determine a pose of the person based on the search region.

2. The apparatus of claim 1, wherein the at least one processor is further configured to determine a bounding volume for a body of the person based on the head pose of the person and the predetermined human-body parameters, and wherein the pose of the person is determined further based on the bounding volume.

3. The apparatus of claim 2, wherein the at least one processor is further configured to determine a mask for the image based on the bounding volume, wherein the mask is associated with pixels representative of the body of the person in the image, and wherein the pose of the person is determined further based on the mask.

4. The apparatus of claim 3, wherein, to determine the mask, the at least one processor is configured to project the bounding volume onto the image and define the mask based on a two-dimensional projection of the bounding volume on the image.

5. The apparatus of claim 3, wherein, to determine the pose of the person, the at least one processor is configured to determine the pose of the person based on the search region of the image and wherein the search region is defined by the mask.

6. The apparatus of claim 5, wherein the at least one processor is configured to determine the pose of the person by using a pose-estimation machine-learning model trained to determine poses of bodies of people based on training images of the bodies of the people.

7. The apparatus of claim 1, wherein the at least one processor is configured to determine the pose of the person by using a pose-estimation machine-learning model trained to determine poses of bodies of people based on training images of the bodies of the people, and wherein the at least one processor is further configured to provide the head pose to the pose-estimation machine-learning model as a prior, wherein the pose-estimation machine-learning model is configured to use the prior as an initial assumption regarding the head pose to determine the pose of the person.

8. The apparatus of claim 1, wherein the at least one processor is further configured to obtain a hand pose of the person, wherein the pose of the person is determined further based on the hand pose.

9. The apparatus of claim 8, wherein the hand pose of the person is determined by a head-mounted device on a head of the person.

10. The apparatus of claim 9, wherein the hand pose of the person is determined based on at least one of hand-tracking technique based on one or more images of one or more hands of the person, the one or more images captured at the head-mounted device or movement data from inertial measurement units (IMUs) in a handheld device in a hand of the person, wherein the movement data is indicative of movements of the handheld device.

11. The apparatus of claim 8, wherein the at least one processor is further configured to determine a bounding volume for a body of the person based on the head pose of the person, the hand pose of the person, and the predetermined human-body parameters, wherein the pose of the person is determined further based on the bounding volume.

12. The apparatus of claim 11, wherein the at least one processor is further configured to determine a mask for the image based on the bounding volume, wherein the mask is associated with pixels representative of the body of the person in the image, wherein the pose of the person is determined further based on the mask.

13. The apparatus of claim 12, wherein, to determine the mask, the at least one processor is configured to project the bounding volume onto the image and define the mask based on a two-dimensional projection of the bounding volume on the image.

14. The apparatus of claim 12, wherein, to determine the pose of the person, the at least one processor is configured to determine the pose of the person based on the search region of the image and wherein the search region is defined by the mask.

15. The apparatus of claim 14, wherein, to determine the pose of the person, the at least one processor is configured to use a pose-estimation machine-learning model trained to determine poses of bodies of people based on training images of the bodies of the people.

16. The apparatus of claim 8, wherein, to determine the pose of the person, the at least one processor is configured to use a pose-estimation machine-learning model trained to determine poses of bodies of people based on training images of the bodies of the people and wherein the at least one processor is further configured to provide the hand pose to the pose-estimation machine-learning model as a prior, wherein the pose-estimation machine-learning model is configured to use the prior as an initial assumption regarding the hand pose to determine the pose of the person.

17. The apparatus of claim 8, wherein, to determine the pose of the person, the at least one processor is configured to use a pose-estimation machine-learning model trained to determine poses based on training images of bodies of people and wherein the at least one processor is further configured to determine an upper-body pose based on the hand pose using inverse kinematics and providing the upper-body pose to the pose-estimation machine-learning model as a prior, wherein the pose-estimation machine-learning model is configured to use the prior as an initial assumption regarding the upper-body pose to determine the pose of the person.

18. The apparatus of claim 8, wherein the at least one processor is further configured to determine a confidence value for the pose of the person based on a comparison between the pose of the person and the hand pose of the person.

19. The apparatus of claim 1, wherein, to determine the pose of the person, the at least one processor is configured to use a pose-estimation machine-learning model trained to determine poses of bodies of people based on training images of the bodies of the people and training head poses.

20. The apparatus of claim 19, wherein the at least one processor is further configured to obtain a hand pose of the person, wherein the pose-estimation machine-learning model is trained to determine the poses of the bodies of the people based on the training images of the bodies of the people, the training head poses, and training hand poses, and wherein the pose of the person is determined further based on the hand pose.

21. The apparatus of claim 1, wherein the head pose of the person is determined by a head-mounted device on a head of the person.

22. The apparatus of claim 21, wherein the head pose of the person is determined based on at least one of movement data from one or more inertial measurement units (IMUs) of the head-mounted device, wherein the movement data is indicative of movements of the head-mounted device, or a simultaneous localization and mapping (SLAM) technique based on images of an environment of the head-mounted device, the images captured at the head-mounted device.

23. The apparatus of claim 1, wherein, to obtain the head pose the at least one processor is configured to receive the head pose from a head-mounted device on a head of the person.

24. The apparatus of claim 1, wherein the at least one processor is further configured to determine a head pose of a user and transmit the head pose of the user.

25. The apparatus of claim 24, wherein the head pose of the user is determined based on at least one of movement data from one or more inertial measurement units (IMUs) of a head-mounted device on a head of the user, wherein the movement data is indicative of movements of the head-mounted device, or a simultaneous localization and mapping (SLAM) technique based on images of an environment of the head-mounted device, the images captured at the head-mounted device.

26. The apparatus of claim 1, wherein the at least one processor is further configured to determine a confidence value for the pose of the person based on a comparison between the pose of the person and the head pose of the person wherein the confidence value is associated with a confidence for using the pose of the person.

27. A method for pose estimation of a person, the method comprising:
obtaining, by at least one processor, an image of the person;

obtaining, by the at least one processor, a head pose of the person;

determining, by the at least one processor, a search region of the image based on the head pose and predetermined human-body parameters; and determining, by the at least one processor, a pose of the person based on the search region.

28. The method of claim 27, further comprising determining, by the at least one processor, a bounding volume for a body of the person based on the head pose of the person and predetermined human-body parameters, wherein the pose of the person is determined further based on the bounding volume.

29. The method of claim 28, further comprising determining, by the at least one processor, a mask for the image based on the bounding volume, wherein the mask is associated with pixels representative of the body of the person in the image, and wherein the pose of the person is determined further based on the mask.

30. The method of claim 29, wherein determining the mask comprises projecting, by the at least one processor, the bounding volume onto the image and defining the mask based on a two-dimensional projection of the bounding volume on the image.

* * * * *